United States Patent
Greenewald et al.

(10) Patent No.: US 11,836,615 B2
(45) Date of Patent: Dec. 5, 2023

(54) BAYESIAN NONPARAMETRIC LEARNING OF NEURAL NETWORKS

(71) Applicant: International Business Machines Corporation, Armonk, NY (US)

(72) Inventors: Kristjan Herbert Greenewald, Belmont, MA (US); Mikhail Yurochkin, Cambridge, MA (US); Mayank Agarwal, Cambridge, MA (US); Soumya Ghosh, Boston, MA (US); Trong Nghia Hoang, Cambridge, MA (US); Yasaman Khazaeni, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 16/576,927

(22) Filed: Sep. 20, 2019

(65) Prior Publication Data

US 2021/0089878 A1    Mar. 25, 2021

(51) Int. Cl.
*G06N 3/08* (2023.01)
*G06N 3/047* (2023.01)

(52) U.S. Cl.
CPC ............... *G06N 3/08* (2013.01); *G06N 3/047* (2023.01)

(58) Field of Classification Search
CPC .................................. G06N 3/08; G06N 3/047
See application file for complete search history.

(56) References Cited

U.S. PATENT DOCUMENTS

| 6,999,950 | B1 | 2/2006 | Linneberg et al. |
| 9,846,836 | B2 | 12/2017 | Gao et al. |
| 2006/0195416 | A1* | 8/2006 | Ewen ................... G06F 16/2471 |
| 2017/0116520 | A1* | 4/2017 | Min ......................... G06N 3/08 |
| 2019/0012592 | A1 | 1/2019 | Beser et al. |
| 2019/0042937 | A1* | 2/2019 | Sheller .................... G06N 3/08 |
| 2019/0050749 | A1 | 2/2019 | Sanketi et al. |
| 2019/0122360 | A1 | 4/2019 | Zhang et al. |

(Continued)

FOREIGN PATENT DOCUMENTS

| GB | 2556981 | 3/2018 |
| WO | 2018057302 | 3/2018 |

OTHER PUBLICATIONS

Lin et al., "Clustering Time Series with Nonlinear Dynamics: A Bayesian Non-Parametric and Particle-Based Approach", Mar. 2019 (Year: 2019).*

(Continued)

*Primary Examiner* — Selene A. Haedi
(74) *Attorney, Agent, or Firm* — Jon Gibbons; Fleit Intellectual Property Law

(57) ABSTRACT

In federated learning problems, data is scattered across different servers and exchanging or pooling it is often impractical or prohibited. A Bayesian nonparametric framework is presented for federated learning with neural networks. Each data server is assumed to provide local neural network weights, which are modeled through our framework. An inference approach is presented that allows us to synthesize a more expressive global network without additional supervision, data pooling and with as few as a single communication round. The efficacy of the present invention on federated learning problems simulated from two popular image classification datasets is shown.

18 Claims, 20 Drawing Sheets

(56) References Cited

U.S. PATENT DOCUMENTS

2019/0171978 A1    6/2019  Bonawitz
2019/0340534 A1*  11/2019  McMahan ............... G06N 20/00
2019/0385043 A1*  12/2019  Choudhary ............ G06N 20/00
2020/0349418 A1*  11/2020  Grabska-Barwinska ....................
                                                        G06N 3/045

OTHER PUBLICATIONS

Xiong et al., "Bayesian Nonparametric Regression Modeling of Panel Data for Sequential Classification", 2018 (Year: 2018).*
Ickstadt et al., "Nonparametric Bayesian Networks", 2012 (Year: 2012).*
McMahan, B., Moore, E., Ramage, D., Hampson, S. & Arcas, B.A. (2017). Communication-Efficient Learning of Deep Networks from Decentralized Data. Proceedings of the 20th International Conference on Artificial Intelligence and Statistics, in PMLR 54:1273-1282 2017.
Yurochkin et al., "Probabilistic Federated Neural Matching", ICLR 2019.
Dean et al., "Large Scale Distributed Deep Networks" 2012.
Smith et al., "Federated Multi-Task Learning", 31st Conference on Neural Information Processing Systems 2017.
Griffiths et al., "The Indian Buffet Process: An Introduction and Review", Journal of Machine Learning Research Dec. 2011.
Chenxin Ma et al.,"Adding vs. Averaging in Distributed Primal-Dual Optimization", Proceedings of the 32 nd International Conference on Machine Learning 2015.
Mu Li, "Scaling Distributed Machine Learning with the Parameter Server", Proceedings of the 11th USENIX Symposium on Operating Systems Design and Implementation Oct. 2014.
Ohad Shamir et al., "Communication-Efficient Distributed Optimization using an Approximate Newton-type Method", 2014.
Romain Thibaux et al., "Hierarchical Beta Processes and the Indian Buffet Process" 2007.
Mikhail Yurochkin et al.,"Supplementary Material for Bayesian Nonparametric Federated Learning of Neural Networks"; uploaded to the website arXiv.org, on Sep. 24, 2018 for the "International Conference on Learning Representations" (ICLR) held on Sep. 27, 2018. This is submitted under 35 U.S.C. § 102(b)(1)(A).
Mikhail Yurochkin et al., "Bayesian Nonparametric Federated Learning of Neural Networks"; uploaded to the website arXiv.org, on Sep. 24, 2018 for the "International Conference on Learning Representations" (ICLR) held on Sep. 27, 2018. This is submitted under 35 U.S.C. § 102(b)(1)(A).

* cited by examiner

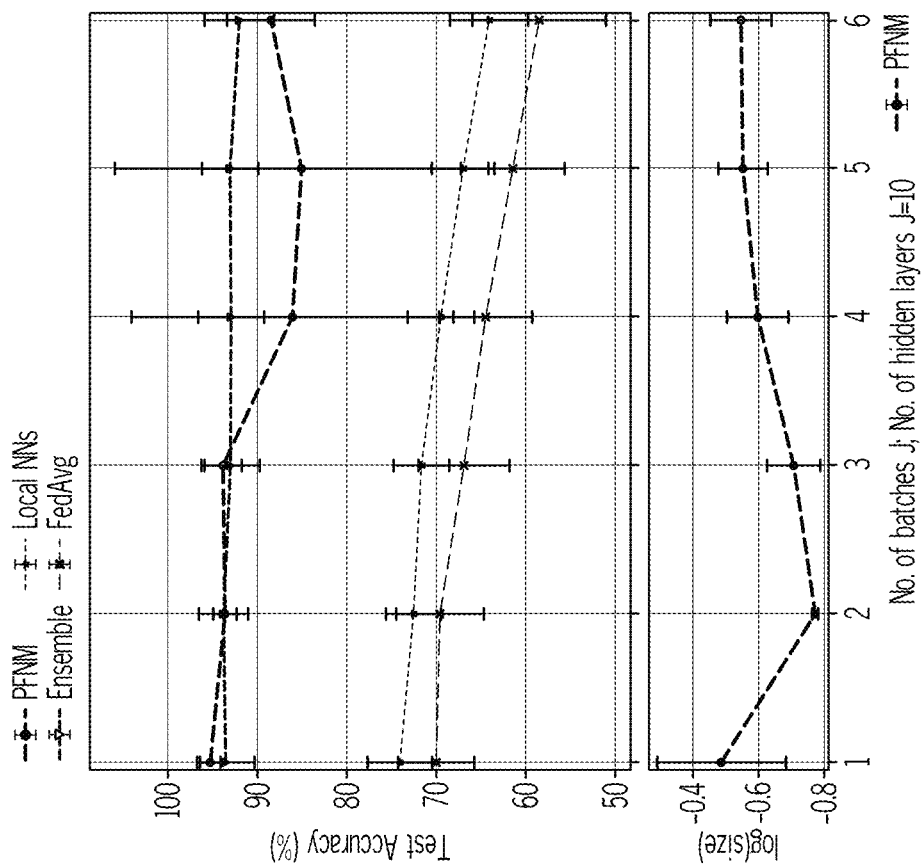
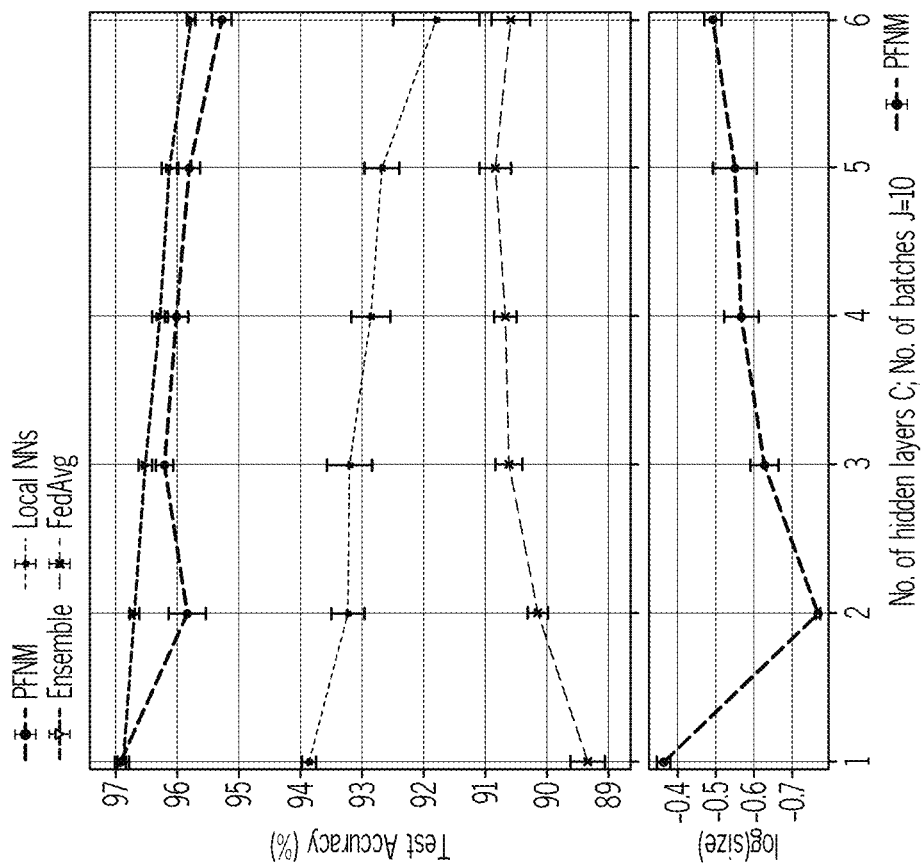
FIG. 6E
FIG. 6F

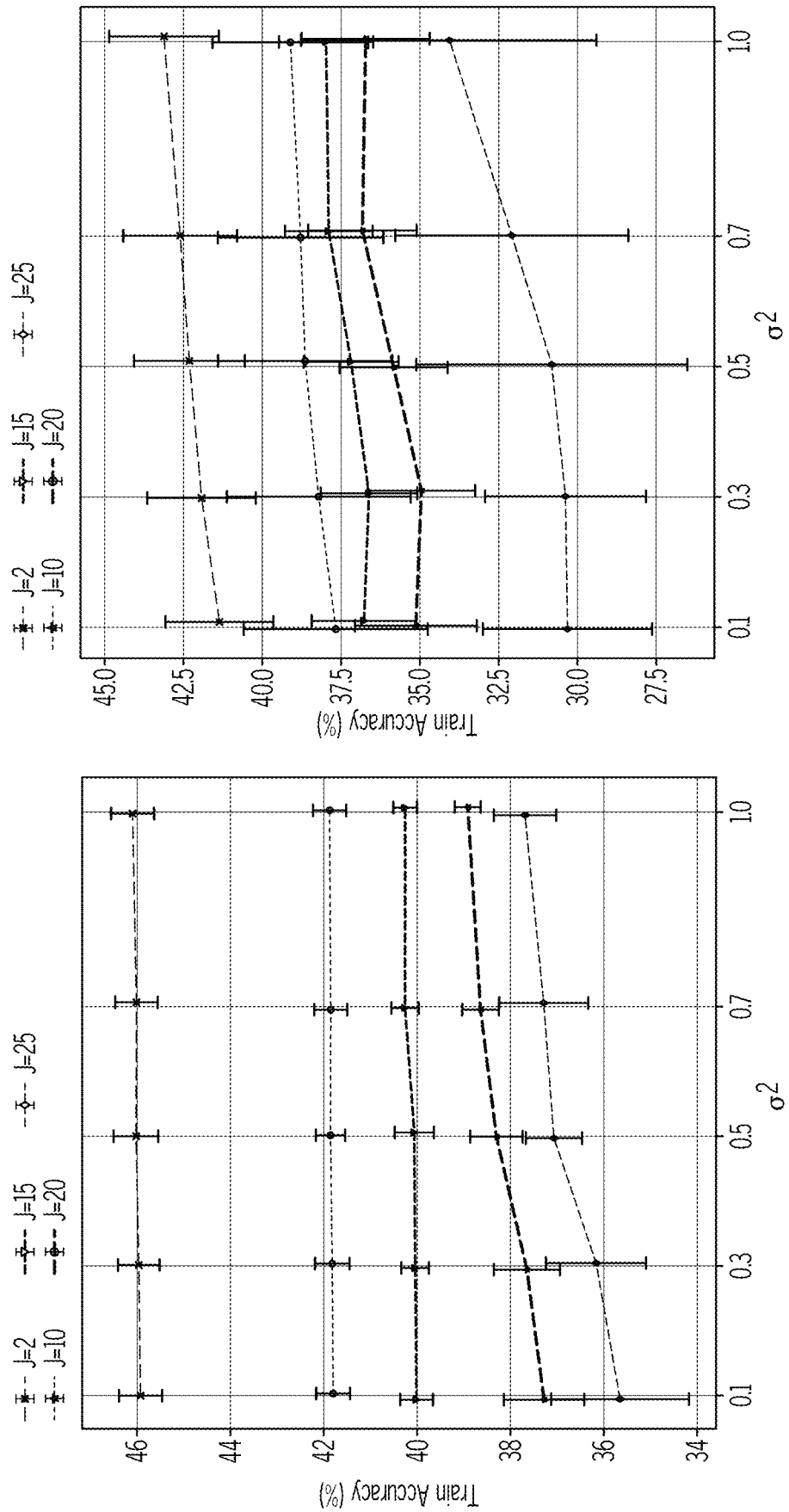

BAYESIAN NONPARAMETRIC LEARNING OF NEURAL NETWORKS

STATEMENT REGARDING PRIOR DISCLOSURES BY THE INVENTOR OR A JOINT INVENTOR

The following disclosure(s) are submitted under 35 U.S.C. § 102(b)(1)(A): A first document entitled "Bayesian Nonparametric Federated Leaning of Neural Networks" and a second document entitled "Supplementary Material for Bayesian Nonparametric Federated Leaning of Neural Networks" were uploaded to the website arXiv.org, on Sep. 24, 2018 for the "International Conference on Learning Representations" (ICLR) held on Sep. 27, 2018.

BACKGROUND

The present invention generally relates to machine learning and more specifically relates to efficiently managing machine learning across a plurality of client devices.

The goal of centralized machine learning, such as federated learning, is to train a high-quality centralized model with training data distributed over a large number of clients. Many times each of these clients have an unreliable and relatively slow network connections, which makes data pooling impractical or difficult. Furthermore, due to privacy or regulatory concerns clients may not be willing to share their data directly or communicate information that could lead to their data being reverse engineered. Reducing an amount of communication over network connections in centralized machine learning is desirable.

SUMMARY

In centralized machine learning data is scattered across different servers and exchanging or pooling it is often impractical or prohibited. A Bayesian nonparametric framework is presented for federated learning with neural networks. Each data server is assumed to provide local neural network weights, which are modeled through the framework described herein. An inference approach is presented that allows a synthesis of a more expressive global network without additional supervision, data pooling and with as few as a single communication round. The simulated efficacy of the present invention on federated learning problems is shown from two popular image classification datasets.

One embodiment of the present invention is a computer-implemented method for managing efficient machine learning. Other embodiments of the present invention include a system and computer program product. The computer-implemented method begins with operating a network in which a plurality of client computing devices are communicatively coupled with a centralized computing device. Each of the plurality of client computing devices includes a local machine learning model that is pre-trained on locally accessible data. The locally accessible data has a common structure across all the plurality of client computing devices. In one embodiment each of the plurality of client computing devices includes a local machine learning model that is a multilayer artificial neural network. In another embodiment each of the plurality of client computing devices includes the local machine learning model that is pre-trained on locally accessible data in which the data is changes overtime. The locally accessible data may have a common structure that is both heterogeneous and overlapping across all the plurality of client computing devices.

Next the computer-implemented method includes accessing, by the centralized computing device, a plurality of artificial local neurons from each of the local machine learning models. In one embodiment the accessing requires only a single read communication between the centralized computing device and each of the plurality of client computing devices.

Next the computer-implemented method further includes clustering each of the plurality of artificial local neurons into a plurality of specific groups as part of a set of global neurons. Examples of clustering disclosed in the present invention includes any combination of:
- performing clustering with permutation-invariant probabilistic matching each of the plurality of artificial neurons using Bayesian nonparametrics;
- performing clustering with groups of weight vectors, bias vectors, or a combination of weight vectors and bias vectors associated with each of the plurality of artificial local neurons;
- controlling clustering by hyperparameters;
- clustering produces a results in which at least one of the plurality of artificial local neurons being left unmatched; and
- clustering produces a results in which a number of neurons in the set of global neurons being smaller than a numeric sum of all of the plurality of artificial local neurons.

Next the computer-implemented method includes forming a global machine learning model layer by averaging the plurality of artificial local neurons previously clustered into one of a plurality of specific groups as part of a set of global neurons.

BRIEF DESCRIPTION OF THE DRAWINGS

In the accompanying figures, like reference numerals refer to identical or functionally similar elements throughout the separate views. The accompanying figures, together with the detailed description below are incorporated in and form part of the specification and serve to further illustrate various embodiments and to explain various principles and advantages all in accordance with the present invention, in which:

FIG. 6A-6H are graphs of simulated efficiency on a single communication federated learning problems using an image classification dataset, according to an embodiment of the present invention;

FIG. 9A-9D are graphs of average train data accuracies for varying $\sigma^2$, according to an embodiment of the present invention.

DETAILED DESCRIPTION

This application includes references denoted in brackets with year of publication. These references are listed in the information disclosure statement (IDS) filed herewith. The teachings of each of these references is hereby incorporated hereinto in their entirety.

Non-Limiting Definitions

The term "artificial neural network" or "ANN" is a learning system modeled after the human brain, operated by a large number of processors operating in parallel.

The term "deep neural network" or "DNN" refers to an artificial neural network having multiple hidden layers of neurons between the input and output layers.

The term "Federated Learning" is a machine learning approach where the goal is to train a high-quality centralized model with training data distributed over a large number of clients. Each of the clients may have, for purposes discussed herein, an unreliable and relatively slow network connections.

The term "hyperparameters" refers to parameters that define properties of the training model, but cannot be learned directly from the process of training the model. Hyperparameters are usually set before the actual training process begins and describe properties such as: the depth of a tree, the rate of learning, the number of hidden layers, or the number of clusters. They are also known as "meta parameters."

The term "model parameters" refers to the parameters in a machine learning model. Model parameters are learned from training data.

The term "meta parameters" is another term for "hyperparameters."

The term "training parameters" is another term for model parameters.

Overview of Federated Learning

Figure 1:
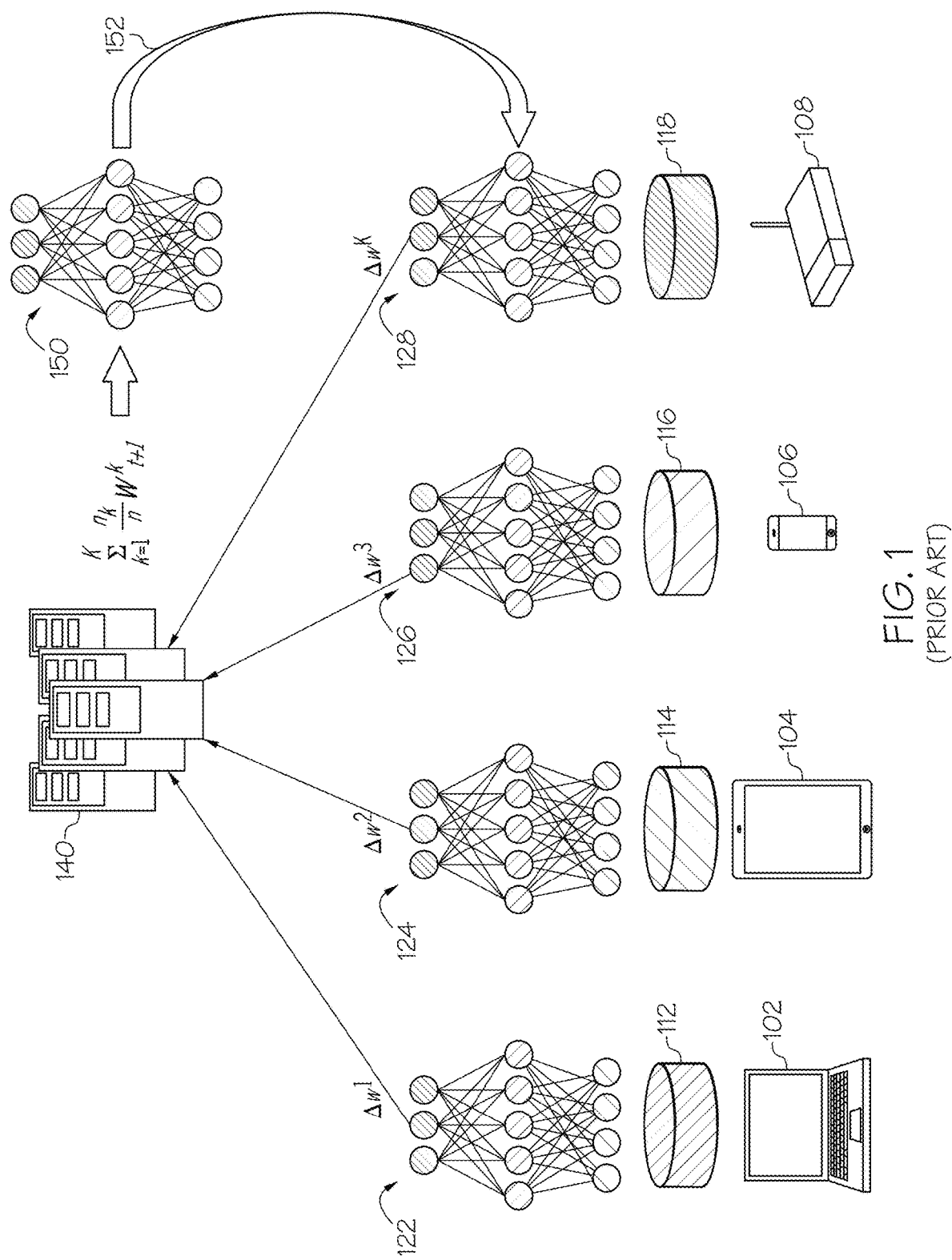
FIG. 1 is a diagram of the overall components of a federated learning system according to the prior art.

FIG. 1 is a diagram of the overall components of a Federated Learning system according to the prior art. Federated learning relay the devices on the edge to participate in the training. In this example a laptop 102, a tablet 104, a smart phone 106 and a mini computer or Internet of Things (IoT) appliance 108 which are communicatively coupled to a centralized machine 140 is shown. Each of the devices has a corresponding file system or database 112, 124, 126, and 128 and a training model 122, 124, 126, and 128. Instead of sending the data in the client to a centralized location, Federated Learning sends the model to the K devices participating in the federation. The model is then re-trained, using transfer learning, with the local data e.g. $\Delta w^1$, $\Delta w^2$, . . . $\Delta w^K$. The data never leaves the devices 102, 104, 106, and 108.

It performs a transfer learning operation using the model it already has or the model in the server 140 (if it's newer). The update done to the local model 122, 124, 126, and 128 is then sent to the server 140. Once the round is closed, the server updates 152 the shared model by doing federated averaging $$\sum_{k=1}^{K} \frac{n_k}{n} w_{t+1}^k$$

where K is the number of devices, $W^K$ is the classifier for model trained using data by the Kth device, and n is a weighting factor.

Introduction to Artificial Intelligence

The standard machine learning paradigm involves algorithms that learn from centralized data, possibly pooled together from multiple data sources. The computations involved may be done on a single machine or farmed out to a cluster of machines. However, in the real world, data often live in silos and amalgamating them may be prohibitively expensive due to communication costs, time sensitivity, or privacy concerns. Consider, for instance, data recorded from sensors embedded in wearable devices. Such data is inherently private, can be voluminous depending on the sampling rate of the sensors, and may be time sensitive depending on the analysis of interest. Pooling data from many users is technically challenging owing to the severe computational burden of moving large amounts of data, and is fraught with privacy concerns stemming from potential data breaches that may expose a user's protected health information (PHI).

Federated learning addresses these pitfalls by obviating the need for centralized data, instead designing algorithms that learn from sequestered data sources. These algorithms iterate between training local models on each data source and distilling them into a global federated model, all without explicitly combining data from different sources. Typical federated learning algorithms, however, require access to locally stored data for learning. A more extreme case surfaces when one has access to models pre-trained on local data but not the data itself. Such situations may arise from catastrophic data loss but increasingly also from regulations such as the general data protection regulation (GDPR) [EU 2016], which place severe restrictions on the storage and sharing of personal data. Learned models that capture only aggregate statistics of the data can typically be disseminated with fewer limitations. A natural question then is, can "legacy" models trained independently on data from different sources be combined into an improved federated model.

Figure 2:
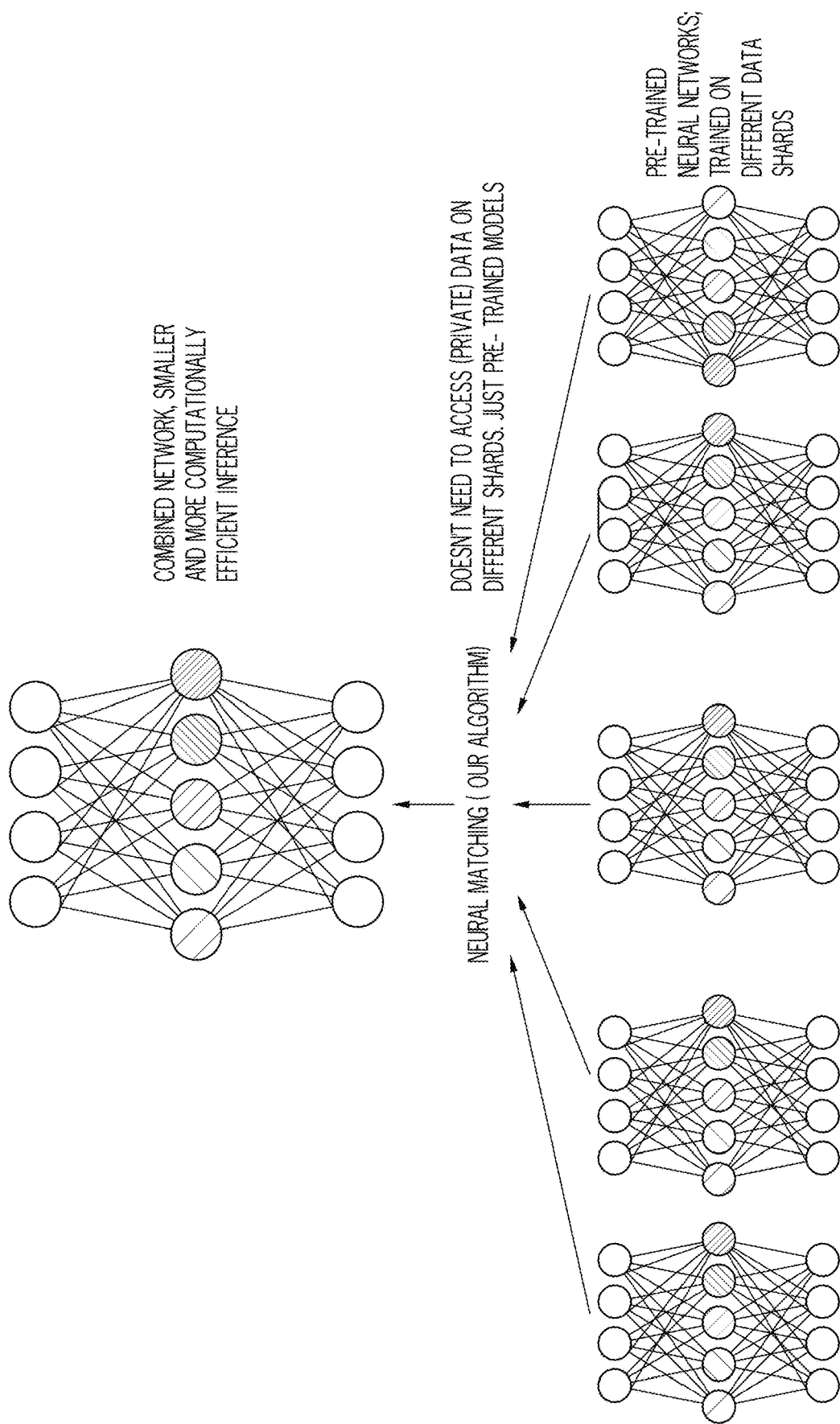
FIG. 2 is a diagram of the overall components using neural matching technique according to an embodiment of the present invention.

Turning to FIG. 2 is a diagram of the overall components using neural matching technique according to an embodiment of the present invention. Here, we develop and carefully investigate a probabilistic federated learning framework with a particular emphasis on training and aggregating neural network models. We assume that either local data or pre-trained models trained on local data are available. When data is available, we proceed by training local models for each data source, in parallel. We then match the estimated local model parameters (groups of weight vectors in the case of neural networks) across data sources to construct a global network. The matching, to be formally defined later, is governed by the posterior of a Beta-Bernoulli process (BBP) [Thibaux & Jordan 2007], a Bayesian nonparametric (BNP) model that allows the local parameters to either match existing global ones or to create new global parameters if existing ones are poor matches.

The present invention provides several advantages over existing approaches. First, it decouples the learning of local models from their amalgamation into a global federated model. This decoupling allows us to remain agnostic about the local learning algorithms, which may be adapted as necessary, with each data source potentially even using a different learning algorithm. Moreover, given only pre-trained models, our BBP informed matching procedure is able to combine them into a federated global model without requiring additional data or knowledge of the learning algorithms used to generate the pre-trained models. This is in sharp contrast with existing work on federated learning of neural networks [McMahan et al. 2017], which require strong assumptions about the local learners, for instance, that they share the same random initialization, and are not applicable for combining pre-trained models. Next, the BNP nature of our model ensures that we recover compressed global models with fewer parameters than the cardinality of the set of all local parameters. Unlike naive ensembles of local models, this allows us to store fewer parameters and perform more efficient inference at test time, requiring only a single forward pass through the compressed model as opposed to J forward passes, once for each local model. While techniques such as knowledge distillation [Hinton et al. 2015] allow for the cost of multiple forward passes to be amortized, training the distilled model itself requires access to data pooled across all sources or an auxiliary dataset, luxuries unavailable in our scenario. Finally, even in the traditional federated learning scenario, where local and global models are learned together, we show empirically that our proposed method outperforms existing distributed training and federated learning algorithms [Dean et al. 2012; McMahan et al. 2017] while requiring far fewer communications between the local data sources and the global model server.

Background of Our Approach

Our approach builds on tools from Bayesian nonparametrics, in particular the Beta-Bernoulli Process (BBP) [Thibaux & Jordan 2007] and the closely related Indian Buffet Process (IBP) [Griffiths & Ghahramani 2011]. We briefly review these ideas before describing our approach.

Beta-Bernoulli Process (BPP)

Let Q be a random measure distributed by a Beta process with mass parameter $\gamma_0$ and base measure H. That is, $Q|\gamma_0, H \sim BP(1, \gamma_0 H)$. It follows that Q is a discrete (not probability) measure $Q = \sum_i q_i \delta_{\theta_i}$ formed by an infinitely countable set of (weight, atom) pairs $(q_i, \theta_i) \in [0,1] \times \Omega$. The weights $\{q_i\}_{i=1}^{\infty}$ are distributed by a stick-breaking process [Teh et al. (2007) Teh, Grur, and Ghahramani]: $c_i \sim Beta(\gamma_0, 1)$, $q_i = \Pi_{j=1}^{i} c_j$ and the atoms are drawn i.i.d from the normalized base measure $\theta_i \sim H/H(\Omega)$ with domain $\Omega$. In this patent, $\Omega$ is simply $\mathbb{R}^D$ for some D. Subsets of atoms in the random measure Q are then selected using a Bernoulli process with a base measure Q. That is, each subset $\mathcal{T}_j$ with $j=1, \ldots, J$ is characterized by a Bernoulli process with base measure Q, $\mathcal{T}_j | Q \sim BeP(Q)$. Each subset $\mathcal{T}_j$ is also a discrete measure formed by pairs $(b_{ji}, \theta_i) \in \{0,1\} \times \Omega$, $T_j := \sum_i b_{ji} \delta_{\theta_i}$, where $b_{ji}|q_i \sim Bernoulli(q_i)$ $\forall i$ is a binary random variable indicating whether atom $\theta_i$ belongs to subset $\mathcal{T}_j$. The collection of such subsets is then said to be distributed by a Beta-Bernoulli process.

Indian Buffet Process (IBP)

The above subsets are conditionally independent given Q. Thus, marginalizing Q will induce dependencies among them. In particular, we have $$\mathcal{T}_j | \mathcal{T}_1, \ldots, \mathcal{T}_{j-1} \sim BeP\left(H \frac{\gamma_0}{J} + \sum_i \frac{m_i}{J} \delta_{\theta_i}\right),$$

where $m_i = \sum_{j=1}^{j-1} b_{ji}$ (dependency on J is suppressed in the notation for simplicity) and is sometimes called the Indian Buffet Process. The IBP can be equivalently described by the following culinary metaphor. Imagine J customers arrive sequentially at a buffet and choose dishes to sample as follows, the first customer tries Poisson($\gamma_0$) dishes. Every subsequent j-th customer tries each of the previously selected dishes according to their popularity, i.e. dish i with probability $m_i/j$, and then tries Poisson($\gamma_0/j$) new dishes.

The IBP, which specifies a distribution over sparse binary matrices with infinitely many columns, was originally demonstrated for latent factor analysis [Ghahramani & Griffiths 2005]. Several extensions to the IBP (and the equivalent BBP) have been developed, see [Griffiths Ghahramani 2011] for a review. Our work is related to a recent application of these ideas to distributed topic modeling [Yurochkin et al. 2018], where the authors use the BBP for modeling topics learned from multiple collections of document, and provide an inference scheme based on the Hungarian algorithm [Kuhn 1955].

Federated and Distributed Learning

Federated learning has garnered interest from the machine learning community of late. [Smith et al. 2017] pose federated learning as a multi-task learning problem, which exploits the convexity and decomposability of the cost function of the underlying support vector machine (SVM) model for distributed learning. This approach however does not extend to the neural network structure considered in our work. [McMahan et al. 2017] use strategies based on simple averaging of the local learner weights to learn the federated model. However, as pointed out by the authors, such naive averaging of model parameters can be disastrous for non-convex cost functions. To cope, they have to use a scheme where the local learners are forced to share the same random initialization. In contrast, our proposed framework is naturally immune to such issues since its development assumes nothing specific about how the local models were trained. Moreover, unlike existing work in this area, our framework is non-parametric in nature allowing the federated model to flexibly grow or shrink its complexity (i.e., its size) to account for varying data complexity.

There is also significant work on distributed deep learning [Lian et al. 2015; 2017, Moritz et al. 2015, Li et al. 2014, Dean et al. 2012]. However, the emphasis of these works is on scalable training from large data and they typically require frequent communication between the distributed nodes to be effective. Yet others explore distributed optimization with a specific emphasis on communication efficiency [Zhang et al. 2013; Shamir et al. 2014; Yang 2013; Ma et al. 2015; Lin 2015]. However, as pointed out by [McMahan et al. 2017], these works primarily focus on settings with convex cost functions and often assume that each distributed data source contains an equal number of data instances. These assumptions, in general, do not hold in our scenario.

Finally, neither these distributed learning approaches nor existing federated learning approaches decouple local training from global model aggregation. As a result they are not suitable for combining pre-trained legacy models, a particular problem of interest in this patent.

Probabilistic Federated Neural Matching

We now describe how the Bayesian nonparametric machinery can be applied to the problem of federated learning with neural networks. Our goal will be to identify subsets of neurons in each of the J local models that match neurons in other local models. We will then appropriately combine the matched neurons to form a global model. Our approach to federated learning builds upon the following basic problem. Suppose we have trained J Multilayer Perceptrons (MLPs) with one hidden layer each. For the jth MLP $j=1, \ldots, J$, let $V_j^{(0)} \in \mathbb{R}^{D \times L_j}$ and $\tilde{v}_j^{(0)} \in \mathbb{R}^{L_j}$ be the weights and biases of the hidden layer; $V_j^{(1)} \in \mathbb{R}^{L_j \times K}$ and $\tilde{v}_j^{(1)} \in \mathbb{R}^K$ be weights and biases of the softmax layer; D be the data dimension, $L_j$ the number of neurons on the hidden layer; and K the number of classes. We consider a simple architecture: $f_j(x) = \text{softmax}(\sigma(xV_j^{(0)} + \tilde{v}_j^{(0)})V_j^{(1)} + \tilde{v}_j^{(1)})$, where $\sigma(\cdot)$ is some nonlinearity (sigmoid, ReLU, etc.). Given the collection of weights and biases $\{V_j^{(0)}, \tilde{v}_j^{(0)}, V_j^{(1)}, \tilde{v}_j^{(1)}\}_{j=1}^J$ we want to learn a global neural network with weights and bias $\Theta^{(0)} \in \mathbb{R}^{D \times L}, \tilde{\theta}^{(0)} \in \mathbb{R}^L, \Theta^{(1)} \in \mathbb{R}^{L \times K}, \tilde{\theta}^{(1)} \in \mathbb{R}^K$ where $L \ll \Sigma_{j=1}^J L_j$ is an unknown number of hidden units of the global network to be inferred.

Our first observation is that ordering of neurons of the hidden layer of an MLP is permutation invariant. Consider any permutation $\tau(1, \ldots, L_j)$ of the j-th MLP—reordering columns of $V_j^{(0)}$, biases $\tilde{v}_j^{(0)}$ and rows of $V_j^{(1)}$ according to $\tau(1, \ldots, L_j)$ will not affect the outputs $f_j(x)$ for any value of x. Therefore, instead of treating weights as matrices and biases as vectors we view them as unordered collections of vectors $V_j^{(0)} = \{v_{jl}^{(0)} \in \mathbb{R}^D\}_{l=1}^{L_j}$, $V_j^{(1)} = \{v_{jl}^{(1)} \in \mathbb{R}^{L_j}\}_{l=1}^K$ and scalars $\tilde{v}_j^{(0)} = \{\tilde{v}_{jl}^{(0)} \in \mathbb{R}\}_{l=1}^{L_j}$ correspondingly.

Hidden layers in neural networks are commonly viewed as feature extractors. This perspective can be justified by the fact that the last layer of a neural network classifier simply performs a softmax regression. Since neural networks often outperform basic softmax regression, they must be learning high quality feature representations of the raw input data. Mathematically, in our setup, every hidden neuron of the j-th MLP represents a new feature $\tilde{x}_l(v_{jl}^{(0)}, \tilde{v}_{jl}^{(0)}) = \sigma(\langle x, v_{jl}^{(0)} \rangle + \tilde{v}_{jl}^{(0)})$. Our second observation is that each $(v_{jl}^{(0)}, \tilde{v}_{jl}^{(0)})$ parameterizes the corresponding neuron's feature extractor. Since, the J MLPs are trained on the same general type of data (not necessarily homogeneous), we assume that they share at least some feature extractors that serve the same purpose. However, due to the permutation invariance issue discussed previously, a feature extractor indexed by l from the j-th MLP is unlikely to correspond to a feature extractor with the same index from a different MLP. In order to construct a set of global feature extractors (neurons) $\{\theta_i^{(0)} \in \mathbb{R}^D, \tilde{\theta}_i^{(0)} \in \mathbb{R}\}_{i=1}^L$ we must model the process of grouping and combining feature extractors of collection of MLPs.

Single Layer Neural Matching

We now present the key building block of our framework, a Beta Bernoulli Process [Thibaux Jordan 2007] based model of MLP weight parameters. Our model assumes the following generative process. First, draw a collection of global atoms (hidden layer neurons) from a Beta process prior with a base measure H and mass parameter $\gamma_0$, $Q = \Sigma_i q_i \delta_{\theta_i}$. In our experiments we choose $H = \mathcal{N}(\mu_0, \Sigma_0)$ as the base measure with $\mu_0 \in \mathbb{R}^{D+1+K}$ and diagonal $\Sigma_0$. Each $\theta_i \in \mathbb{R}^{D+1+K}$ is a concatenated vector of $[\theta_i^{(0)} \in \mathbb{R}^D, \tilde{\theta}_i^{(0)} \in \mathbb{R}, \theta_i^{(1)} \in \mathbb{R}^K]$ formed from the feature extractor weight-bias pairs with the corresponding weights of the softmax regression. In what follows, we will use "batch" to refer to a partition of the data.

Next, for each $j=1, \ldots, J$ select a subset of the global atoms for batch j via the Bernoulli process:

$$\mathcal{T}_j := \Sigma_i b_{ji} \delta_{\theta_i}, \text{ where } b_{ji}|q_i \sim \text{Bern}(q_i) \forall i. \quad (1)$$

$\mathcal{T}_j$ is supported by atoms $\{\theta_i: b_{ji} = 1, i=1, 2, \ldots\}$, which represent the identities of the atoms (neurons) used by batch j. Finally, assume that observed local atoms are noisy measurements of the corresponding global atoms:

$$v_{jl}|\mathcal{T}_j \sim \mathcal{N}(\mathcal{T}_{j,l}, \Sigma_j) \text{ for } l=1, \ldots, L_j; L_j := \text{card}(\mathcal{T}_j), \quad (2)$$

with $v_{jl} = [v_{jl}^{(0)}, \tilde{v}_{jl}^{(0)}, v_{jl}^{(1)}]$ being the weights, biases, and softmax regression weights corresponding to the l-th neuron of the j-th MLP trained with $L_j$ neurons on the data of batch j.

Under this model, the key quantity to be inferred is the collection of random variables that match observed atoms (neurons) at any batch to the global atoms. We denote the collection of these random variables as $\{B^j\}_{j=1}^J$, where $B_{i,l}^j = 1$ implies that $\mathcal{T}_{j,l} = \theta_i$ (there is a one-to-one correspondence between $\{b_{ji}\}_{i=1}^\infty$ and $B^j$).

Maximum A Posteriori Estimation

We now derive an algorithm for MAP estimation of global atoms for the model presented above. The objective function to be maximized is the posterior of $\{\theta_i\}_{i=1}^\infty$ and $\{B^j\}_{j=1}^J$:

$$\arg\max_{\{\theta_i\},\{B^j\}} P(\{\theta_i\},\{B^j\}|\{v_{jl}\}) \quad (3)$$

$$\propto P(\{v_{jl}\}|\{\theta_i\},\{B^j\})P(\{B^j\})P(\{\theta_i\}).$$

Note that the next proposition easily follows from Gaussian-Gaussian conjugacy: Proposition 1 Given $\{B^j\}$, the MAP estimate of $\{\theta_i\}$ is given by $$\hat{\theta}_i = \frac{\mu_0/\sigma_0^2 + \sum_{j,l} B_{i,l}^j v_{jl}/\sigma_j^2}{1/\sigma_0^2 + \sum_{j,l} B_{i,l}^j/\sigma_j^2} \text{ for } i=1, \ldots, L, \quad (4)$$

where for simplicity we assume $\Sigma_0 = I\sigma_0^2$ and $\Sigma_j = I\sigma_j^2$.

Using this fact we can cast optimization corresponding to (3) with respect to only $\{B^j\}_{j=1}^J$. Taking the natural logarithm we obtain:

$$\arg\max_{[B^j]} \frac{1}{2} \sum_i \frac{\left\|\frac{\mu_0}{\sigma_0^2} + \sum_{j,l} B_{i,l}^j \frac{v_{jl}}{\sigma_j^2}\right\|^2}{1/\sigma_0^2 + \sum_{j,l} B_{i,l}^j/\sigma_j^2} = \log(P(\{B^j\})). \quad (5)$$

The approach in the present invention builds on tools from Bayesian nonparametrics, in particular the Beta-Bernoulli Process (BBP) [Thibaux & Jordan 2007] and the closely related Indian Buffet Process (IBP) [Griffiths & Ghahramani 2011]. We briefly review these ideas before describing the approach described in the present invention.

Consider an iterative optimization approach: fixing all but one $B^j$ we find corresponding optimal assignment, then pick a new j at random and proceed until convergence. In the following we will use notation $-j$ to denote "all but j". Let $L_{-j} = \max\{i: B_{i,l}^{-j} = 1\}$ denote number of active global weights outside of group j. We now rearrange the first term of (5) by partitioning it into $i=1, \ldots, L_{-j}$ and $i=L_{-j}+1, \ldots, L_{-j}+L_j$. We are interested in solving for $B^j$, hence we can modify the objective function by subtracting terms independent of $B^j$ and noting that $\Sigma_l\, B_{i,l}{}^j \in \{0,1\}$, i.e. it is 1 if some neuron from batch j is matched to global neuron i and 0 otherwise:

$$\frac{1}{2}\sum_i \frac{\left\|\mu_0/\sigma_0^2 + \sum_{j,l} B_{i,l}^j v_{jl}/\sigma_j^2\right\|^2}{1/\sigma_0^2 + \sum_{j,l} B_{i,l}^j/\sigma_j^2} = \tag{6}$$

$$\sum_{i=1}^{L_{-j}+L_j} \sum_{l=1}^{L_j} B_{i,l}^j \left( \frac{\left\|\mu_0/\sigma_0^2 + v_{jl}/\sigma_j^2 + \sum_{-j,l} B_{i,l}^j v_{jl}/\sigma_j^2\right\|^2}{1/\sigma_0^2 + 1/\sigma_j^2 + \sum_{-j,l} B_{i,l}^j/\sigma_j^2} - \right.$$

$$\left. \frac{\left\|\mu_0/\sigma_0^2 + \sum_{-j,l} B_{i,l}^j v_{jl}/\sigma_j^2\right\|^2}{1/\sigma_0^2 + \sum_{-j,l} B_{i,l}^j/\sigma_j^2} \right).$$

Now we consider the second term of (5): $\log P(\{B^j\}) = \log P(B^j|B^{-j}) + \log P(B^{-j})$.

First, because we are optimizing for $B^j$, we can ignore $\log P(B^{-j})$. Second, due to exchangeability of batches (i.e. customers of the IBP), we can always consider $B^j$ to be the last batch (i.e. last customer of the IBP). Let $m_i^{-j} = \Sigma_{-j,l} B_{i,l}^j$ denote number of times batch weights were assigned to global weight i outside of group j. We then obtain:

$$\log P(\{B^j\}) = \sum_{i=1}^{L_{-j}} \sum_{l=1}^{L_j} B_{i,l}^j \log \frac{m_i^{-j}}{J - m_i^{-j}} + \tag{7}$$

$$\sum_{i=L_{-j}+1}^{L_{-j}+L_j} \sum_{l=1}^{L_j} B_{i,l}^j \left( \log \frac{\gamma_0}{J} - \log(i - L_{-j}) \right)$$

Combining equations (6) and (7) we obtain the assignment cost objective, which we solve with the Hungarian algorithm.

Proposition 2 The (negative) assignment cost specification for finding $B^j$ is $-C_{i,l}{}^j =$ $$\begin{cases} \dfrac{\left\|\dfrac{\mu_0}{\sigma_0^2} + \dfrac{v_{jl}}{\sigma_j^2} + \sum_{-j,l} B_{i,l}^j \dfrac{v_{jl}}{\sigma_j^2}\right\|^2}{\dfrac{1}{\sigma_0^2} + \dfrac{1}{\sigma_j^2} + \sum_{-j,l} B_{i,l}^j/\sigma_j^2} - \dfrac{\left\|\dfrac{\mu_0}{\sigma_0^2} + \sum_{-j,l} B_{i,l}^j \dfrac{v_{jl}}{\sigma_j^2}\right\|^2}{\dfrac{1}{\sigma_0^2} + \sum_{-j,l} B_{i,l}^j/\sigma_j^2} + 2\log \dfrac{m_i^{-j}}{J - m_i^{-j}}, & i \leq L_{-j} \\[2em] \dfrac{\left\|\dfrac{\mu_0}{\sigma_0^2} + \dfrac{v_{jl}}{\sigma_j^2}\right\|^2}{\dfrac{1}{\sigma_0^2} + \dfrac{1}{\sigma_j^2}} - \dfrac{\left\|\dfrac{\mu_0}{\sigma_0^2}\right\|^2}{\dfrac{1}{\sigma_0^2}} - 2\log\dfrac{i - L_{-j}}{\gamma_0/J}, & L_{-j} < i \leq L_{-j} + L_j \end{cases} \tag{8}$$

We then apply the Hungarian algorithm to find the minimizer of $\Sigma_i \Sigma_l B_{i,l}^j C_{i,l}^j$ and obtain the neuron matching assignments. Proof is described in Supplement section 1.

Figure 3:
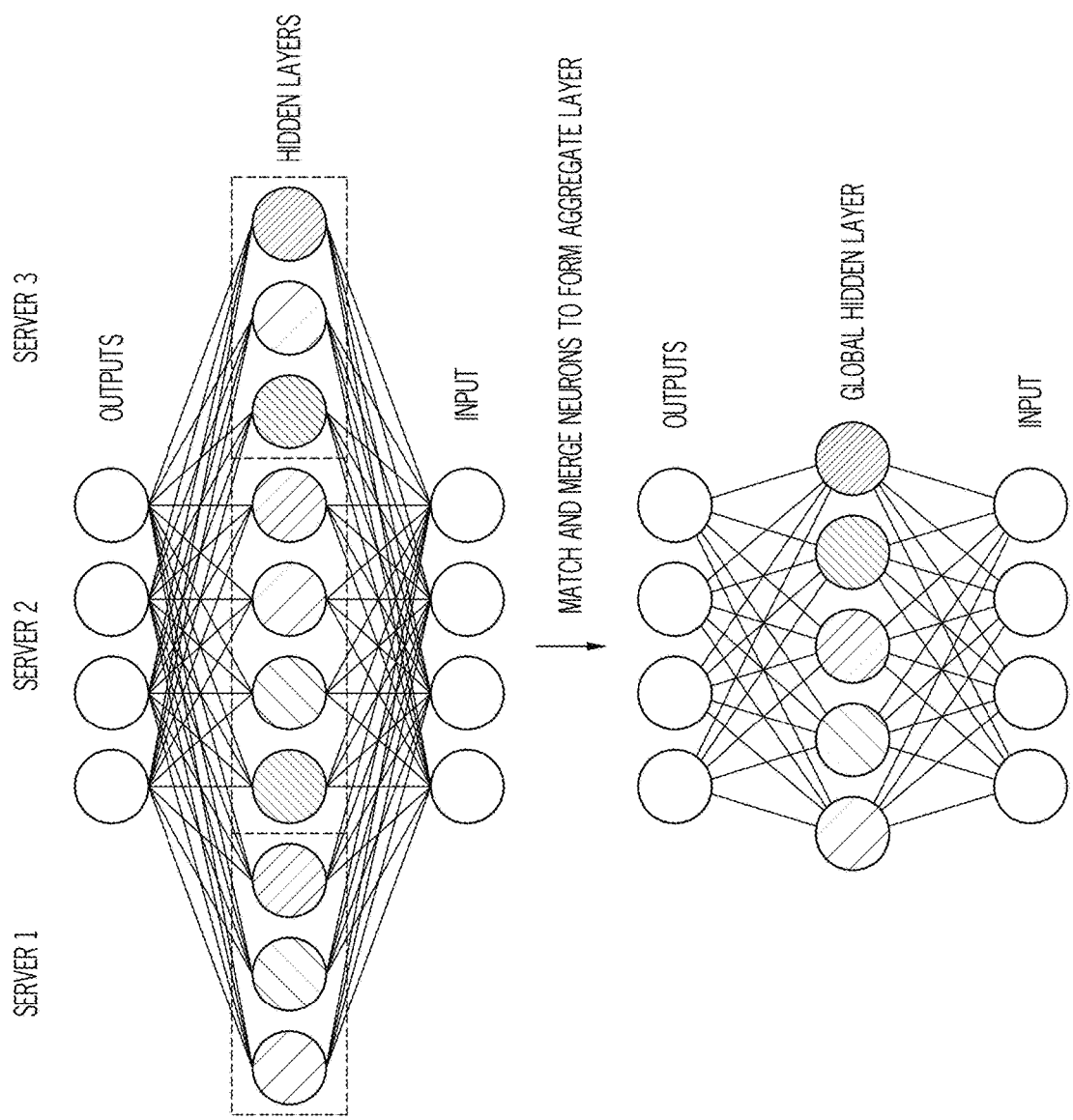
FIG. 3 is a diagram of a single layer process of matching and merging neurons to form an aggregate layer according to an embodiment of the present invention.

We summarize the overall single layer inference procedure in FIG. 3, which is a diagram of a single layer process of matching and merging neurons to form an aggregate layer according to an embodiment of the present invention. Algorithm 1 presents the details. Shown is a single layer probabilistic neural matching algorithm showing matching of three MLPs. Nodes in the graphs indicate neurons, neurons of the same color have been matched. Our approach consists of using the corresponding neurons in the output layer to convert the neurons in each of the J servers to weight vectors referencing the output layer. These weight vectors are then used to form a cost matrix, which the Hungarian algorithm then uses to do the matching. The matched neurons are then aggregated via Proposition 1 to form the global model

| Algorithm 1 Single Layer Neural Matching |
|---|
| 1: Collect weights and biases from the J servers and form $v_{jl}$. |
| 2: Form assignment cost matrix per (8). |
| 3: Compute matching assignments $B^j$ using the Hungarian algorithm (Supplement section 1). |
| 4: Enumerate all resulting unique global neurons and use (4) to infer the associated global weight vectors from all instances of the global neurons across the J servers. |
| 5: Concatenate the global neurons and the inferred weights and biases to form the new global hidden layer. |

Multilayer Neural Matching

The model we have presented thus far can handle any arbitrary width single layer neural network, which is known to be theoretically sufficient for approximating any function of interest [Hornik et al. 1989]. However, deep neural networks with moderate layer widths are known to be beneficial both practically [LeCun et al. 2015] and theoretically [Poggio et al 2017]. We extend our neural matching approach to these deep architectures by defining a generative model of deep neural network weights from outputs back to inputs (top-down). Let C denote the number of hidden layers and $L^c$ the number of neurons on the c-th layer. Then $L^{C+1} = K$ is the number of labels and $L^0 = D$ is the input dimension. In the top down approach, we consider the global atoms to be vectors of outgoing weights from a neuron instead of weights forming a neuron as it was in the single hidden layer model. This change is needed to avoid base measures with unbounded dimensions.

Starting with the top hidden layer $c=C$, we generate each layer following a model similar to that used in the single layer case. For each layer we generate a collection of global atoms and select a subset of them for each batch using Beta-Bernoulli process construction. $L^{c+1}$ is the number of neurons on the layer $c+1$, which controls the dimension of the atoms in layer c.

Definition 1: (Multilayer generative process) Starting with layer c=C, generate (as in the single layer process)

$$Q^c | \gamma_0^c, H^c, L^{c+1} \sim BP(1, \gamma_0^c H^c), \quad (9)$$

then $Q^c = \Sigma_i q_i^c \delta_{\theta_i^c}, \theta_i^c \sim \mathcal{N}(\mu_0^c, \Sigma_0^c), \mu_0^c \in \mathbb{R}^{L^{c+1}}$ $\mathcal{T}_j^c := \Sigma_i b_{ji}^c \delta_{\theta_i^c}$, where $b_{ji}^c | q_i^c \sim \text{Bern}(q_i^c)$.

This $\mathcal{T}_j^c$ is the set of global atoms (neurons) used by batch j in layer c, it contains atoms $\{\theta_i^c : b_{ji}^c = 1, i = 1, 2, \ldots\}$. Finally, generate the observed local atoms:

$$v_{ji}^c | \mathcal{T}_j^c \sim \mathcal{N}(\mathcal{T}_j^c, \Sigma_j^c) \text{ for } l = 1, \ldots, L_j^c, \quad (10)$$

where we have set $L_j^c := \text{card}(\mathcal{T}_j^c)$. Next, compute the generated number of global neurons $L^c = \text{card}\{\bigcup_{j=1}^J \mathcal{T}_j^c\}$ and repeat this generative process for the next layer c−1. Repeat until all layers are generated (c=C, ..., 1).

An important difference from the single layer model is that we should now set to 0 some of the dimensions of $v_{ji}^c \in \mathbb{R}^{L^{c+1}}$ since they correspond to weights outgoing to neurons of the layer c+1 not present on the batch j, i.e. $v_{ji}^c := 0$ if $b_{ji}^{c+1} = 0$ for $i = 1, \ldots, L^{c+1}$. The resulting model can be understood as follows. There is a global fully connected neural network with $L^c$ neurons on layer c and there are J partially connected neural networks with $L_j^c$ active neurons on layer c, while weights corresponding to the remaining $L^c - L_j^c$ neurons are zeroes and have no effect locally.

Remark 1: The model in the present invention can handle permuted ordering of the input dimensions across batches, however in most practical cases the ordering of input dimensions is consistent across batches. Thus, we assume that the weights connecting the first hidden layer to the inputs exhibit permutation invariance only on the side of the first hidden layer. Similarly to how all weights were concatenated in the single hidden layer model, we consider $\mu_0^c \in \mathbb{R}^{D+L^{c+1}}$ for c=1. We also note that the bias term can be added to the model, we omitted it to simplify notation.

Figure 4:
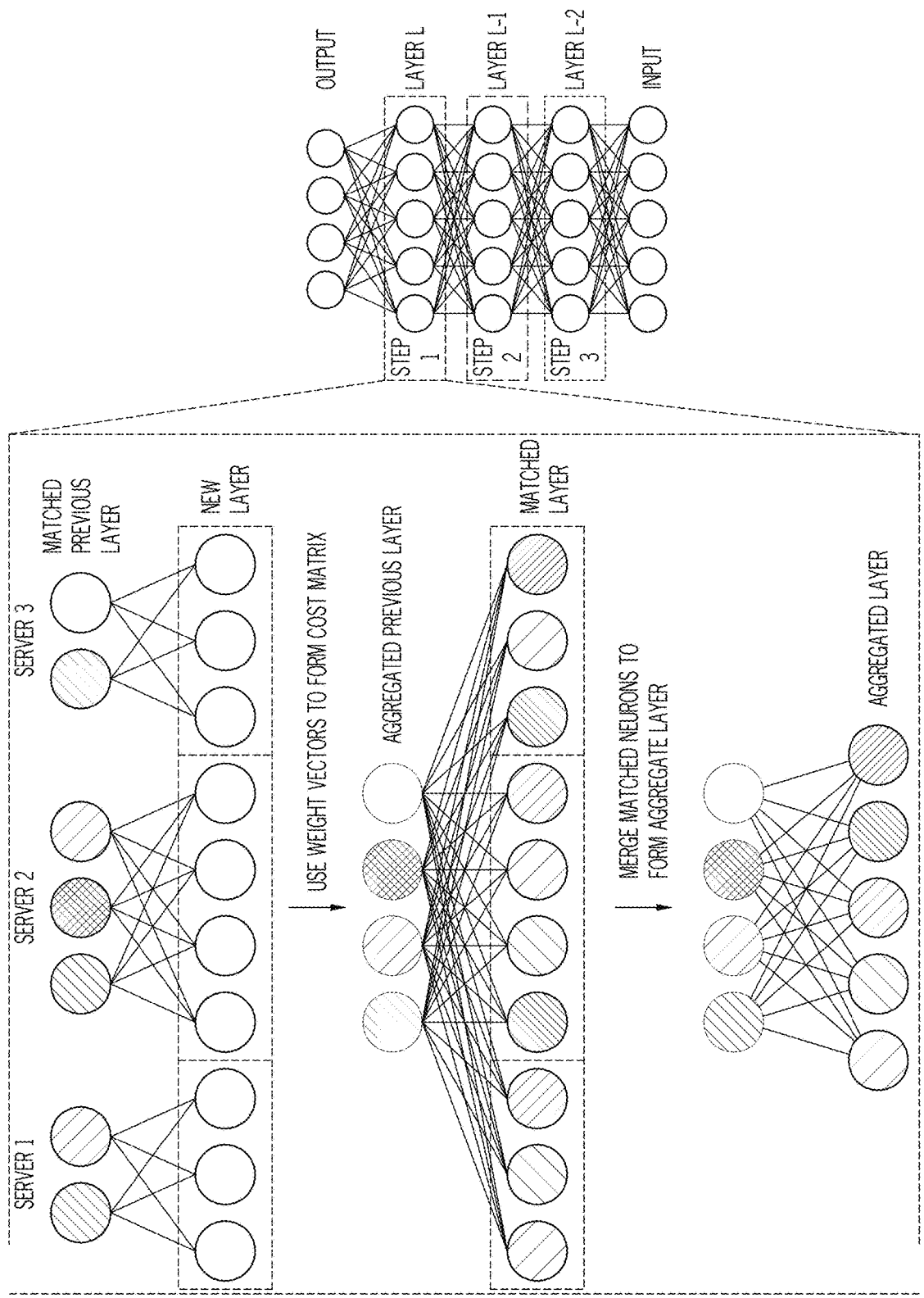
FIG. 4 is a diagram of a multilayer process of matching and merging neurons to form an aggregate layer according to an embodiment of the present invention.

Inference: Following the top-down generative model, we adopt a greedy inference procedure that first infers the matching of the top layer and then proceeds down the layers of the network. This is possible because the generative process for each layer depends only on the identity and number of the global neurons in the layer above it, hence once we infer the c+1th layer of the global model we can apply the single layer inference algorithm (Algorithm 1) to the cth layer. This greedy setup is illustrated in FIG. 4 as further described below. The per-layer inference follows directly from the single layer case, yielding the following propositions.

Proposition 3: The (negative) assignment cost specification for finding $B^{j,c}$ is $-C_{i,l}^{j,c} =$ $$\begin{cases} \frac{\left\| \frac{\mu_0^c}{(\sigma_0^c)^2} + \frac{v_{jl}^c}{(\sigma_j^c)^2} + \sum_{-j,l} B_{i,l}^{j,c} \frac{v_{jl}^c}{(\sigma_j^c)^2} \right\|^2}{\frac{1}{(\sigma_0^c)^2} + \frac{1}{(\sigma_j^c)^2} + \sum_{-j,l} B_{i,l}^{j,c} / (\sigma_j^c)^2} + 2\log \frac{m_i^{-j,c}}{J - m_i^{-j,c}}, \quad i \leq L_{-j}^c \\ - \frac{\left\| \mu_0^c / (\sigma_0^c)^2 + \sum_{-j,l} B_{i,l}^{j,c} v_{jl}^c / (\sigma_j^c)^2 \right\|^2}{1/(\sigma_0^c)^2 + \sum_{-j,l} B_{i,l}^{j,c} / (\sigma_j^c)^2}, \\ \frac{\left\| \frac{\mu_0^c}{(\sigma_0^c)^2} + \frac{v_{jl}^c}{(\sigma_j^c)^2} \right\|^2}{\frac{1}{(\sigma_0^c)^2} + \frac{1}{(\sigma_j^c)^2}} - \frac{\| \mu_0^c / (\sigma_0^c)^2 \|^2}{1/(\sigma_0^c)^2} - 2\log \frac{i - L_{-j}^c}{\gamma_0 / J}, \quad L_{-j}^c < i \leq L_{-j}^c + L_j^c \end{cases}$$

where for simplicity we assume $\Sigma_0^c = I(\sigma_0^c)^2$ and $\Sigma_j^c = I(\sigma_j^c)^2$. We then apply the Hungarian algorithm to find the minimizer of $\Sigma_i \Sigma_l B_{i,l}^{j,c} C_{i,l}^{j,c}$ and obtain the neuron matching assignments.

Proposition 4: Given the assignment $\{B^{j,c}\}$, the MAP estimate of $\{\theta_i^c\}$ is given by $$\hat{\theta}_i^c = \frac{\mu_0^c / (\sigma_0^c)^2 + \sum_{j,l} B_{i,l}^{j,c} v_{jl}^c / (\sigma_j^c)^2}{1/(\sigma_0^c)^2 + \sum_{j,l} B_{i,l}^{j,c} / (\sigma_j^c)^2} \text{ for } i = 1, \ldots, L. \quad (11)$$

We combine these propositions and summarize the overall multilayer inference procedure in Algorithm 2 described below.

Single Hidden Layer Inference

The goal of maximum a posteriori (MAP) estimation is to maximize posterior probability of the latent variables: global atoms $\{\theta_i\}_{i=1}^\infty$ and assignments of observed neural network weight estimates to global atoms $\{B^j\}_{j=1}^J$, given estimates of the batch weights $$\{v_{jl} \text{for} l=1, \ldots, L_j\}_{j=1}^J: \arg \max_{\{\theta_i\}, \{B_j\}} P(\{\theta_i\}, \{B^j\} | \{v_{jl}\}) \propto P(\{v_{jl}\} | \{\theta_i\}, \{B^j\}) P(\{B^j\}) P(\{\theta_i\}). \quad (12)$$

MAP estimates given matching. First we note that given $\{B^j\}$ it is straightforward to find MAP estimates of $\{\theta_i\}$ based on Gaussian-Gaussian conjugacy:

$$\hat{\theta}_i = \frac{\sum_{j,l} B_{i,l}^j v_{jl} / \sigma_j^2}{1/\sigma_0^2 + \sum_{j,l} B_{i,l}^j / \sigma_j^2} \text{ for } i = 1, \ldots, L, \quad (13)$$

where $L = \max\{i: B_{i,l}^j = 1 \text{ for } l = 1, \ldots, L_j, j = 1, \ldots, J\}$ is the number of active global atoms, which is an (unknown) latent random variable identified by $\{B^j\}$. For simplicity we assume $\Sigma_0 = I\sigma_0^2$, $\Sigma_j = I\sigma_j^2$ and $\mu_0 = 0$.

Inference of atom assignments: We can now cast optimization corresponding to (1) with respect to only $\{B^j\}_{j=1}^J$. Taking natural logarithm we obtain:

$$-\frac{1}{2} \sum_i \left( \frac{\|\hat{\theta}_i\|^2}{\sigma_0^2} + D\log(2\pi\sigma_0^2) + \sum_{j,l} B_{i,l}^j \frac{\|v_{jl} - \hat{\theta}_i\|^2}{\sigma_j^2} \right) + \log(P(\{B^j\})). \quad (14)$$

We now simplify the first term of (3) (in this and subsequent derivations we use $\equiv$ to say that two objective functions are equivalent up to terms independent of the variables of interest):

$$-\frac{1}{2}\sum_{i}\left(\frac{\|\hat{\theta}_i\|^2}{\sigma_0^2} + D\log(2\pi\sigma_0^2) + \sum_{j,l} B_{i,l}^j \frac{\|v_{jl} - \hat{\theta}_i\|^2}{\sigma_j^2}\right) = -\frac{1}{2} \quad (15)$$

$$\sum_{i}\left(\frac{\langle \hat{\theta}_i, \hat{\theta}_i\rangle}{\sigma_0^2} + D\log(2\pi\sigma_0^2) + \sum_{j,l} B_{i,l}^j \frac{\langle v_{jl}, v_{jl}\rangle - 2\langle v_{jl}, \hat{\theta}_i\rangle + \langle \hat{\theta}_i, \hat{\theta}_i\rangle}{\sigma_{jl}^2}\right) \cong$$

$$-\frac{1}{2}\sum_{i}\left(\langle \hat{\theta}_i, \hat{\theta}_i\rangle \left(\frac{1}{\sigma_0^2} + \sum_{j,l}\frac{B_{i,l}^j}{\sigma_j^2}\right) + D\log(2\pi\sigma_0^2) - 2\left\langle\hat{\theta}_i, \sum_{j,l} B_{i,l}^j \frac{v_{jl}}{\sigma_j^2}\right\rangle\right) =$$

$$\frac{1}{2}\sum_{i}\left(\langle \hat{\theta}_i, \hat{\theta}_i\rangle \left(\frac{1}{\sigma_0^2} + \sum_{j,l}\frac{B_{i,l}^j}{\sigma_j^2}\right) - D\log(2\pi\sigma_0^2)\right) =$$

$$\frac{1}{2}\sum_{i}\left(\frac{\left\|\sum_{j,l} B_{i,l}^j v_{jl}/\sigma_j^2\right\|^2}{1/\sigma_0^2 + \sum_{j,1} B_{i,1}^j/\sigma_j^2} - D\log(2\pi\sigma_0^2)\right).$$

We consider an iterative optimization approach: fixing all but one $B^j$ we find the corresponding optimal assignment, then pick a new j at random and repeat until convergence. We define notation $-j$ to denote "all but j", and let $L_{-j}=\max\{i: B_{i,l}^{-j}=1\}$ denote number of active global weights outside of group j. We partition (4) between $i=1, \ldots, L_{-j}$ and $i=L_{-j}+1, \ldots, L^{-j}+L_j$, and since we are solving for $B^j$, we subtract terms independent of $B^j$:

$$\sum_{i}\left(\frac{\left\|\sum_{j,l} B_{i,l}^j v_{jl}/\sigma_j^2\right\|^2}{1/\sigma_0^2 + \sum_{j,l} B_{i,l}^j/\sigma_j^2} - D\log(2\pi\sigma_0^2)\right) \cong \quad (16)$$

$$\sum_{i=1}^{L_{-j}}\left(\frac{\left\|\sum_l B_{i,l}^j v_{jl}/\sigma_j^2 + \sum_{-j,l} B_{i,l}^j v_{jl}/\sigma_j^2\right\|^2}{1/\sigma_0^2 + \sum_l B_{i,l}^j/\sigma_j^2 + \sum_{-j,l} B_{i,l}^j/\sigma_j^2} - \frac{\left\|\sum_{-j,l} B_{i,l}^j v_{jl}/\sigma_j^2\right\|^2}{1/\sigma_0^2 + \sum_{-j,l} B_{i,l}^j/\sigma_j^2}\right) +$$

-continued $$\sum_{i=L_{-j}+1}^{L_{-j}+L_j}\left(\frac{\left\|\sum_l B_{i,l}^j v_{jl}/\sigma_j^2\right\|^2}{1/\sigma_0^2 + \sum_l B_{i,l}^j/\sigma_j^2}\right).$$

Now observe that $\Sigma_l B_{i,l}^j \in \{0,1\}$, i.e. it is 1 if some neuron from batch j is matched to global neuron i and 0 otherwise. Due to this we can rewrite (5) as a linear sum assignment problem:

$$\sum_{i=1}^{L_{-j}}\sum_{l=1}^{L_j} B_{i,l}^j\left(\frac{\left\|v_{jl}/\sigma_j^2 + \sum_{-j,l} B_{i,l}^j v_{jl}/\sigma_j^2\right\|^2}{1/\sigma_0^2 + 1/\sigma_j^2 + \sum_{-j,l} B_{i,l}^j/\sigma_j^2} - \right. \quad (17)$$

$$\left. \frac{\left\|\sum_{-j,l} B_{i,l}^j v_{jl}/\sigma_j^2\right\|^2}{1/\sigma_0^2 + \sum_{-j,l} B_{i,l}^j/\sigma_j^2}\right) + \sum_{i=L_{-j}+1}^{L_{-j}+L_j}\sum_{l=1}^{L_j} B_{i,l}^j\left(\frac{\|v_{jl}/\sigma_j^2\|^2}{1/\sigma_0^2 + 1/\sigma_j^2}\right).$$

Now we consider second term of (3):
log $P(\{B^j\})=\log P(B^j|B^{-j})+\log P(B^{-j})$. First, because we are optimizing for $B^j$, we can ignore log $P(B^{-j})$. Second, due to exchangeability of batches (i.e. customers of the IBP), we can always consider $B^j$ to be the last batch (i.e. last customer of the IBP). Let $m_i^{-j}=\Sigma_{-j,l} B_{i,l}^j$ denote number of times batch weights were assigned to global atom i outside of group j. We now obtain the following:

$$\log P(B^j \mid B^{-j}) \cong \quad (18)$$

$$E_{i=1}^{L_{-j}}\left(\left(\sum_{l=1}^{L_j} B_{i,l}^j\right)\log\frac{m_i^{-j}}{J} + \left(1 - \sum_{l=1}^{L_j} B_{i,l}^j\right)\log\frac{J-m_i^{-j}}{J}\right) -$$

$$\log\left(\sum_{i=L_{-j}+1}^{L_{-j}+L_j}\sum_{l=1}^{L_j} B_{i,l}^j\right) + \left(\sum_{i=L_{-j}+1}^{L_{-j}+L_j}\sum_{l=1}^{L_j} B_{i,l}^j\right)\log\frac{\gamma_0}{J}.$$

We now rearrange (7) as linear sum assignment problem:

$$\sum_{i=1}^{L_{-j}}\sum_{l=1}^{L_j} B_{i,l}^j\log\frac{m_i^{-j}}{J - m_i^{-j}} + \quad (19)$$

$$\sum_{i=L_{-j}+1}^{L_{-j}+L_j}\sum_{l=1}^{L_j} B_{i,l}^j\left(\log\frac{\gamma_0}{J} - \log(i - L_{-j})\right).$$

Combining (6) and (8) we arrive at the cost specification for finding $B^j$ as minimizer of $\Sigma_i \Sigma_l B_{i,l}^j C_{i,l}^j$, where:

$$C_{i,l}^j = -\begin{cases} \dfrac{\left\|\dfrac{v_{jl}}{\sigma_j^2} + \sum_{-j,l} B_{i,l}^j \dfrac{v_{jl}}{\sigma_j^2}\right\|^2}{\dfrac{1}{\sigma_0^2} + \dfrac{1}{\sigma_j^2} + \sum_{-j,l} B_{i,l}^j/\sigma_j^2} - \dfrac{\left\|\sum_{-j,l} B_{i,l}^j \dfrac{v_{jl}}{\sigma_j^2}\right\|^2}{\dfrac{1}{\sigma_0^2} + \sum_{-j,l} B_{i,l}^j/\sigma_j^2} & i \leq L_{-j} \\ +2\log\dfrac{m_i^{-j}}{J - m_i^{-j}}, & \\ \dfrac{\left\|\dfrac{v_{jl}}{\sigma_j^2}\right\|^2}{\dfrac{1}{\sigma_0^2} + \dfrac{1}{\sigma_j^2}} - 2\log\dfrac{i - L_{-j}}{\gamma_0/J}, & L_{-j} < i \leq L_{-j} + L_j \end{cases} \quad (20)$$

This completes the proof of Proposition 2 in the main text.

Multilayer Inference Details

FIG. 4 illustrates the overall multilayer inference procedure visually, and Algorithm 2 provides the details. As shown in FIG. 4 probabilistic Federated Neural Matching algorithm showing matching of three multilayer MLPs. Nodes in the graphs indicate neurons, neurons of the same color have been matched. On the left, the individual layer matching approach is shown, consisting of using the matching assignments of the next highest layer to convert the neurons in each of the J batches to weight vectors referencing the global previous layer. These weight vectors are then used to form a cost matrix, which the Hungarian algorithm then uses to do the matching. Finally, the matched neurons are then aggregated and averaged to form the new layer of the global model. As shown on the right, in the multilayer setting the resulting global layer is then used to match the next lower layer, etc. until the bottom hidden layer is reached (Steps 1, 2, 3, . . . in order).

Algorithm 1 Multilayer PFNM

1:     $L^{C+1}$ ← number of outputs
2:     # Top down iteration through layers
3:     for layers c = C, C − 1, . . . , 2 do
4:        Collect hidden layer c from the J batches and form $v_{jl}^c$.
5:        Call Single Layer Neutral Matching algorithm with output dimension $L^{c+1}$ and input dimension 0 (since we do not use the weights connecting to lower layers here).
6:        Form global neuron layer c from output of the single layer matching.
7:        $L^c$ ← card ($\cup_{j=1}^{J} T_j^c$) (greedy approach).
8:     end for
9:     # Match bottom layer using weights connecting to both the input and the layer above.
10:     Call Single Layer Neutral Matching algorithm with output dimension $L^2$ and input dimension equal to the number of inputs.
11:     Return global assignments and form global mutltilayer model.

Complexity Analysis

In this section we present a brief discussion of the complexity of our algorithms. The worst case complexity per layer is achieved when no neurons are matched and is equal to $\mathcal{O}(D(JL_j)^2)$ for building the cost matrix and $\mathcal{O}((JL_j)^3)$ for running the Hungarian algorithm, where $L_j$ is the number of neurons per batch (here for simplicity we assume that each batch has same number of neurons) and J is the number of batches. The best case complexity per layer (i.e. when all neurons are matched) is $\mathcal{O}(DL_j^2 + L_j^3)$, also note that complexity is independent of the data size. In practice the complexity is closer to the best case since global model size is moderate (i.e. $L \ll \Sigma_j L_j$). Actual timings with our code for the experiments in the main text are as follows—40 sec for FIG. 2a,b at J=30 groups; 500 sec for c, d at J=30 (the $DL_j^2$ term is dominating as CIFAR10 dimension is much higher than MNIST); 60 sec for e, f (J=10) at C=6 layers; 150 sec for g, h (J=10) at C=6. The computations were done using 2 CPU cores and 4 GB memory on a machine with 3.0 GHz core speed. We note that (i) this computation only needs to be performed once (ii) the cost matrix construction which appears to be dominating can be trivially sped up using GPUs (iii) recent work demonstrates impressive large scale running times for the Hungarian algorithm using GPUs [Date Nagi (2016)].

Neural Matching with Additional Communications

In the traditional federated learning scenario, where local and global models are learned together, common approach (see e.g., [McMahan et al. 2017] is to learn via rounds of communication between local and global models. Typically, local model parameters are trained for few epochs, sent to server for updating the global model and then reinitialized with the global model parameters for the new round. One of the key factors in federated learning is the number of communications required to achieve accurate global model. In the preceding sections we proposed Probabilistic Federated Neural Matching (PFNM) to aggregate local models in a single communication round. Our approach can be naturally extended to benefit from additional communication rounds as follows.

Let t denote a communication round. To initialize local models at round t+1 we set $v_{jl}^{t+1} = \Sigma_i B_{i,l}^{j,t} \theta_i^t$. Recall that $\Sigma_i B_{i,l}^{j,t} = 1$ $\forall l=1, \ldots, L_j$, $j=1, \ldots, J$, hence a local model is initialized with a subset of the global model, keeping local model size $L_j$ constant across communication rounds (this also holds for the multilayer case). After local models are updated we proceed to apply matching to obtain new global model. Note that global model size can change across communication rounds, in particular we expect it to shrink as local models improve on each step.

Example Flow

Figure 5:
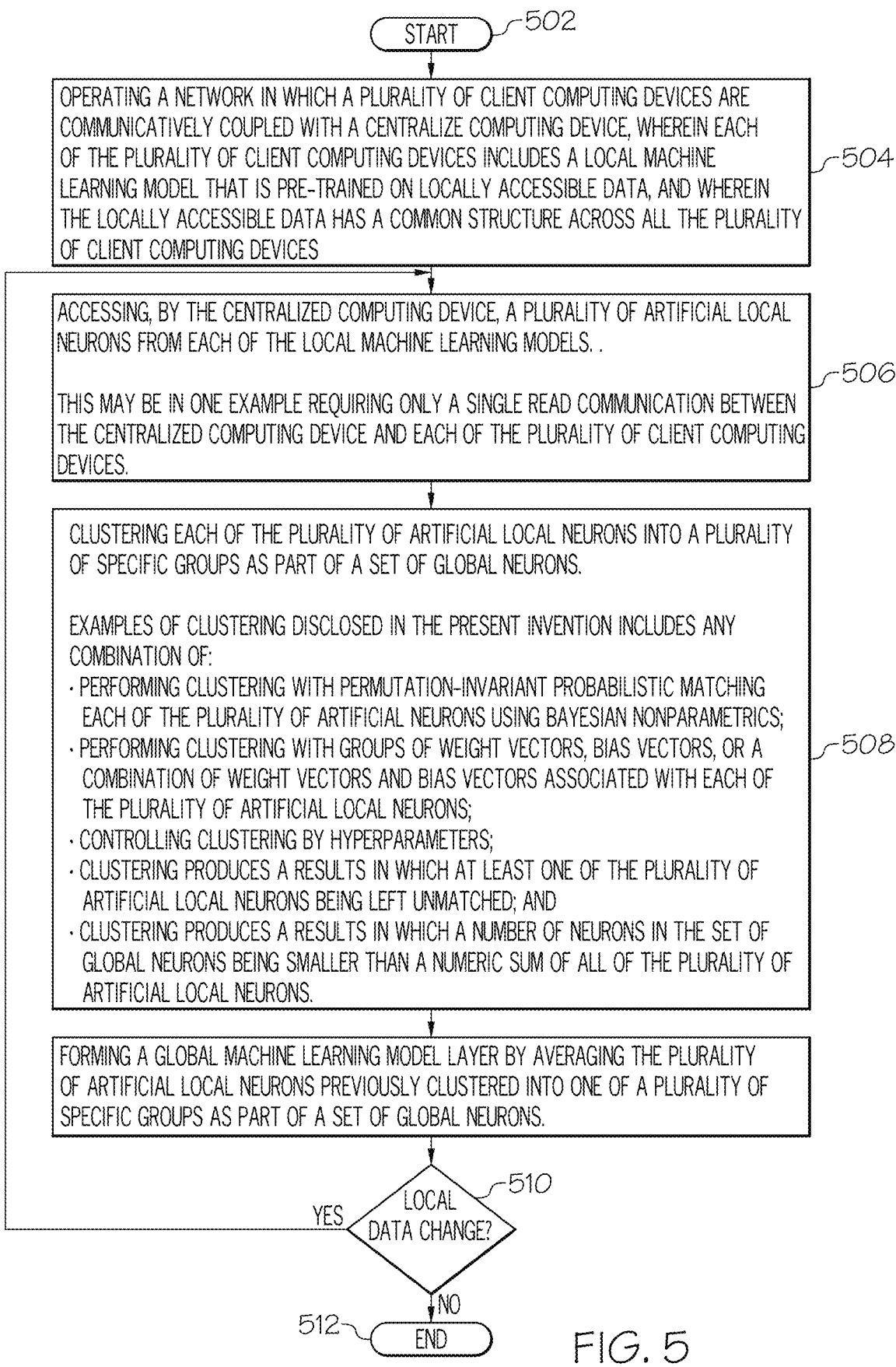
FIG. 5 is a flow chart illustrating the matching and margining neurons, according to an embodiment of the present invention.
Figure 6A:
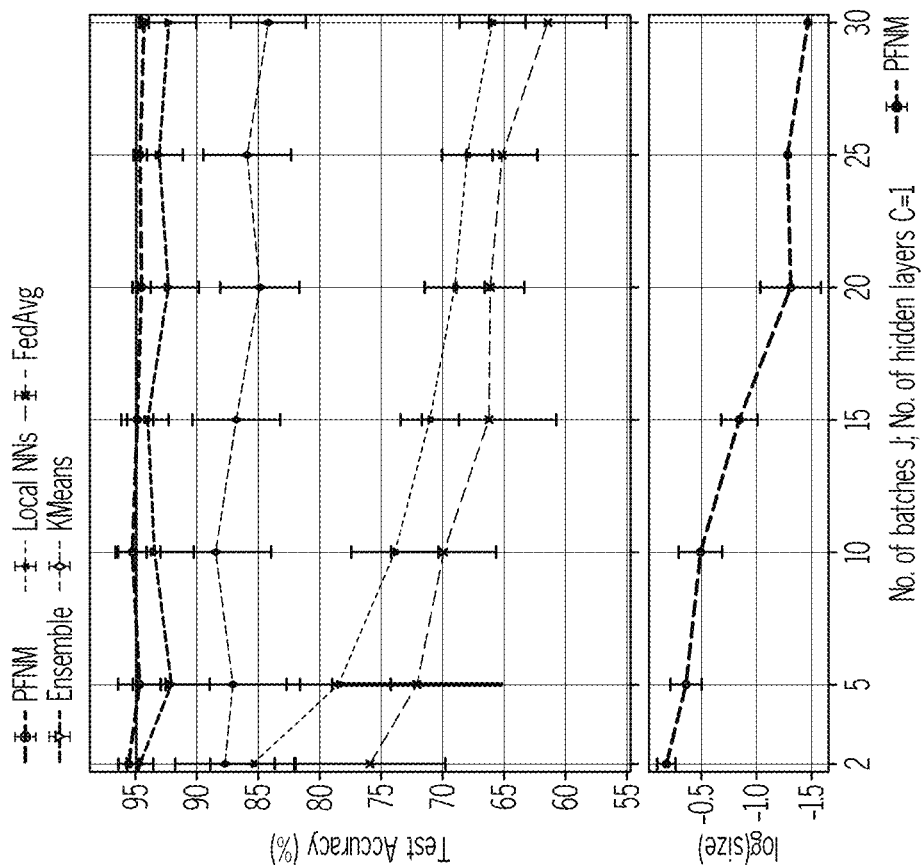
Figure 6B:
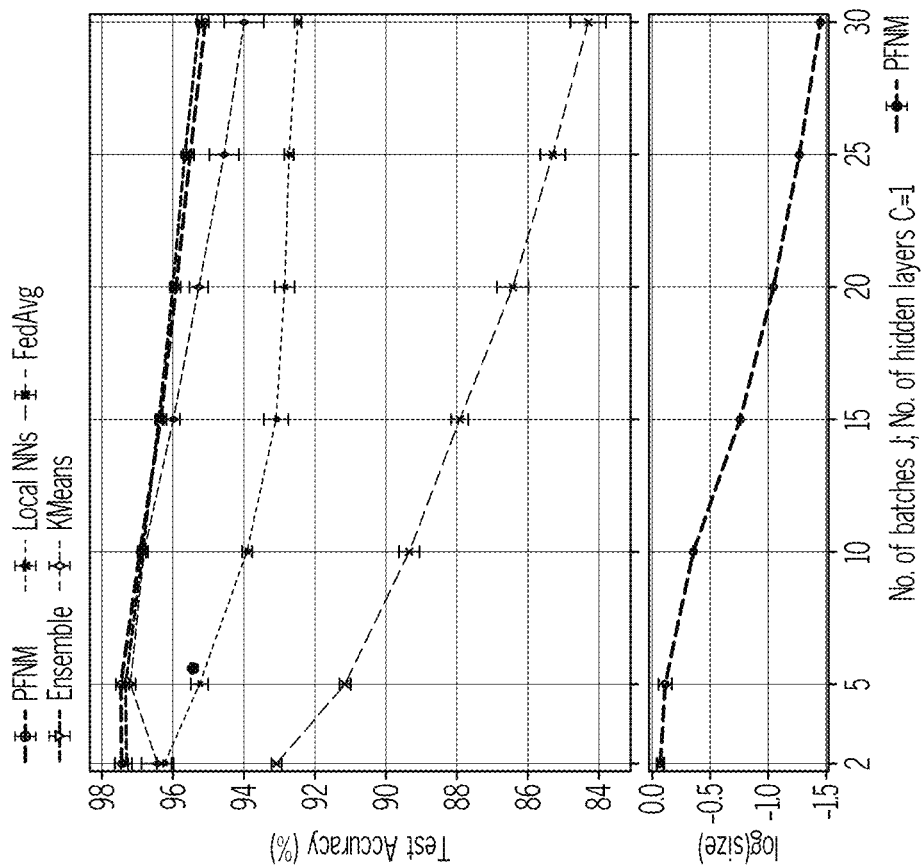
Figures 6C, 6D:
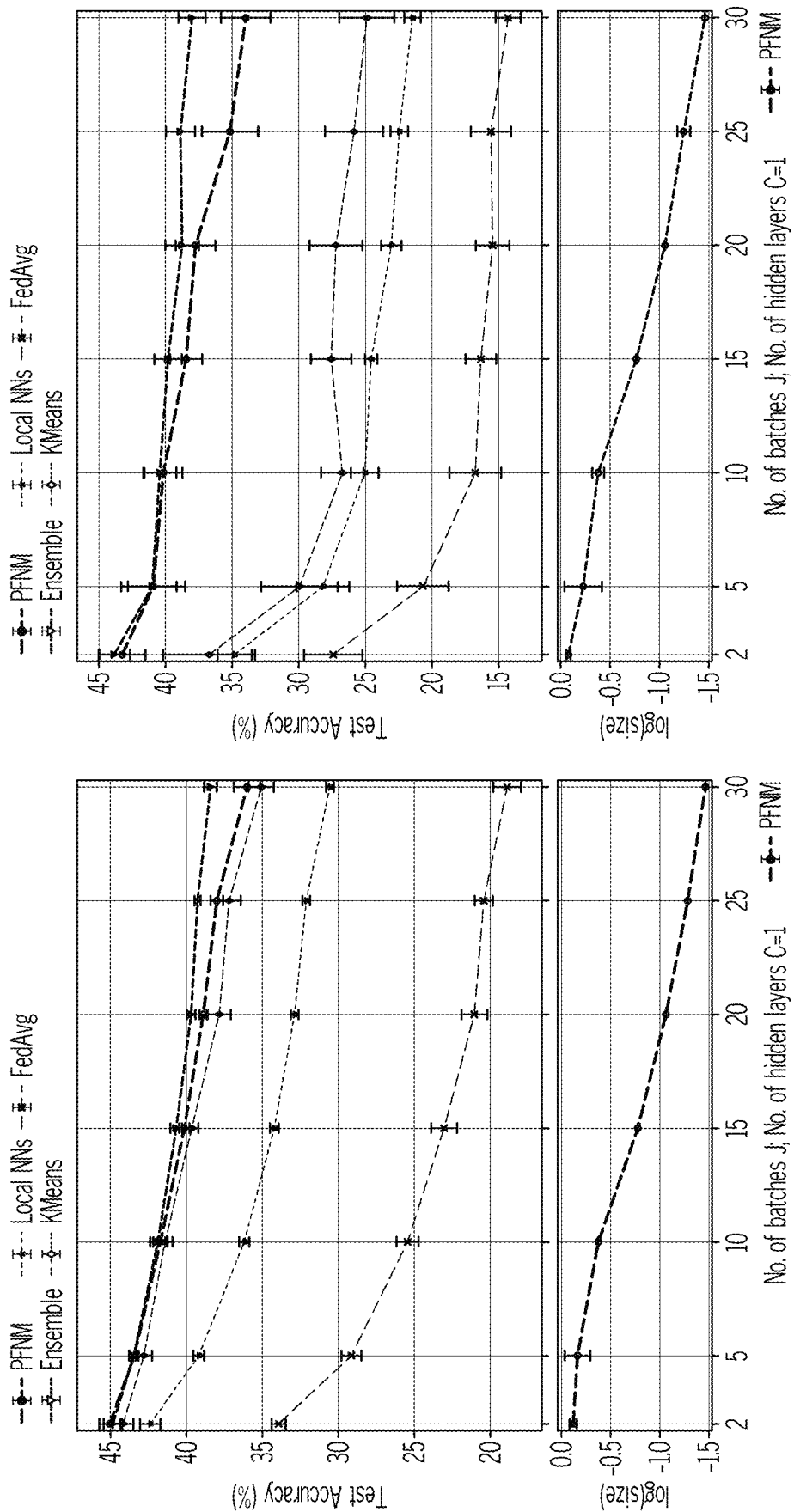
Figure 6H:
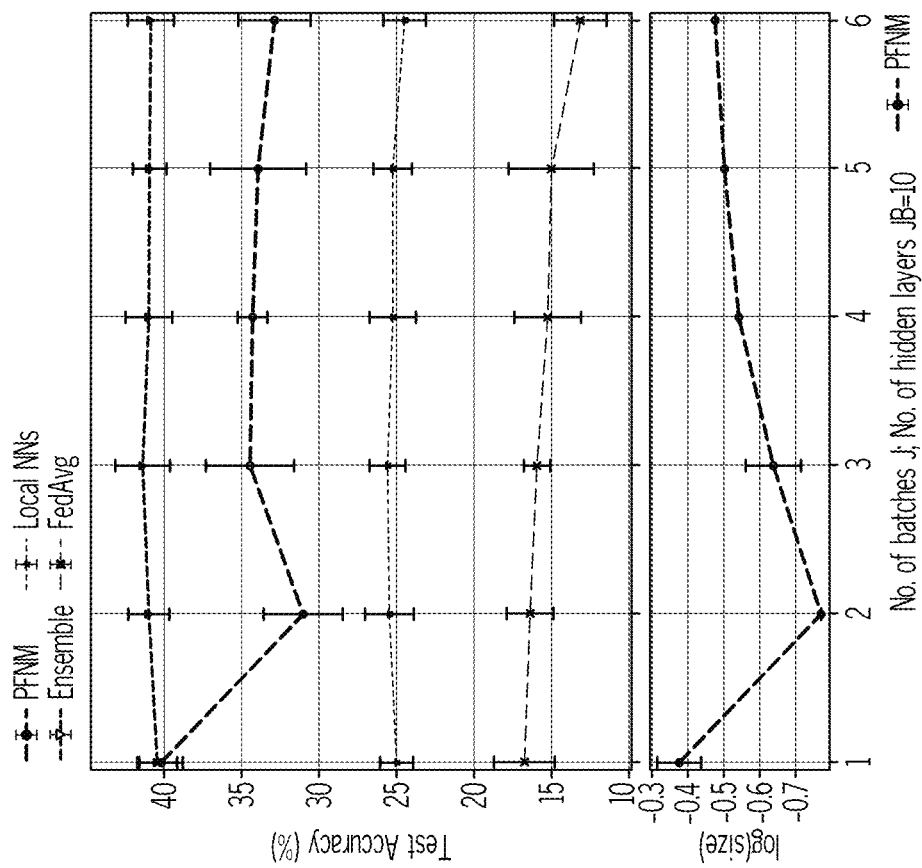
Figure 6G:
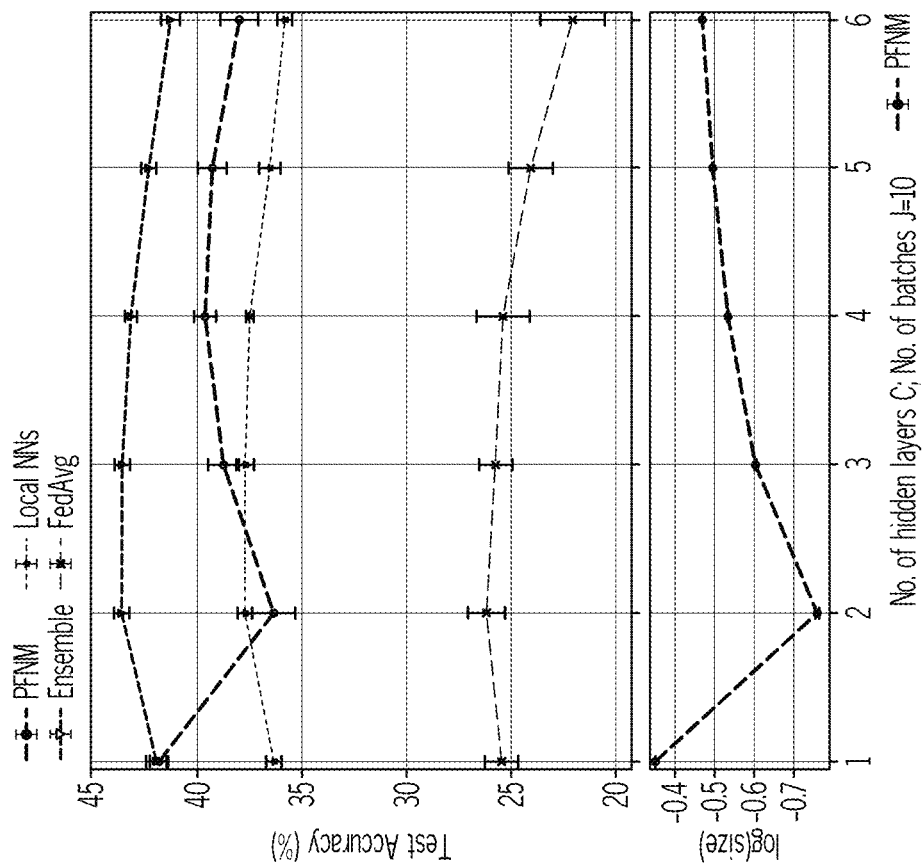
Figures 7A, 7B:
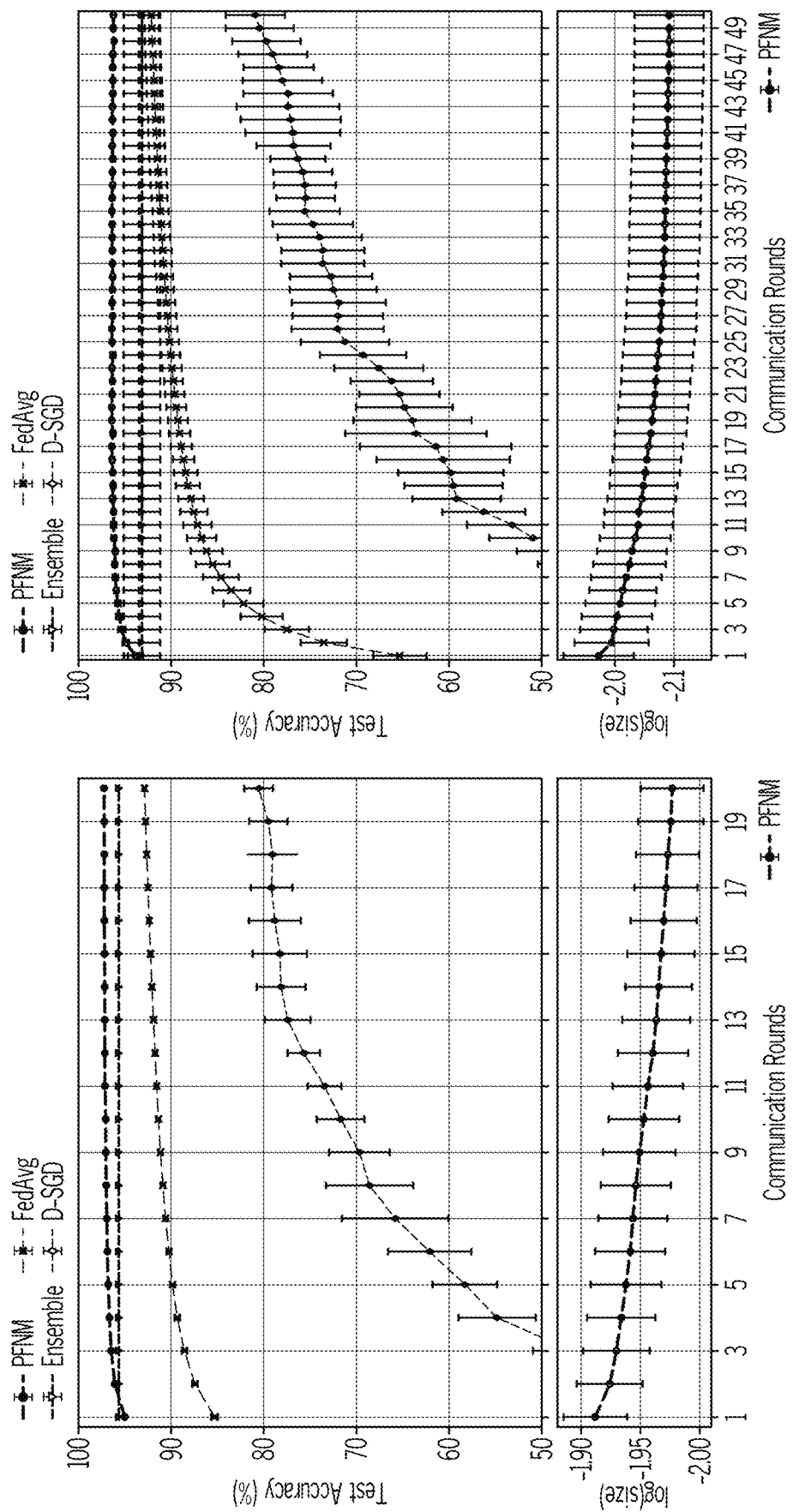
FIG. 7A-7H are graphs of simulated efficiency with a communications on federated learning problems using an image classification dataset, according to an embodiment of the present invention.
Figures 7C, 7D:
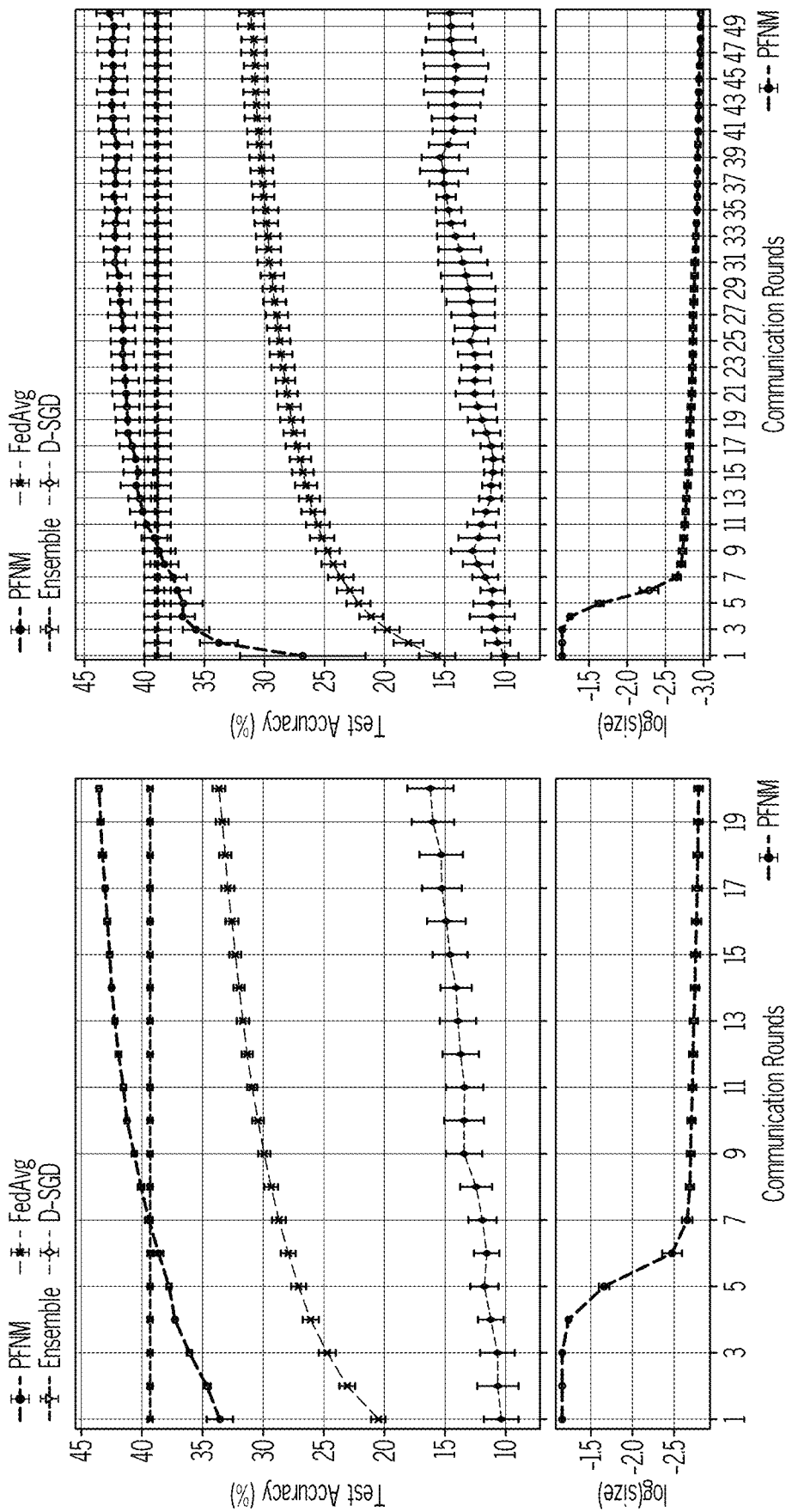
Figure 7E:
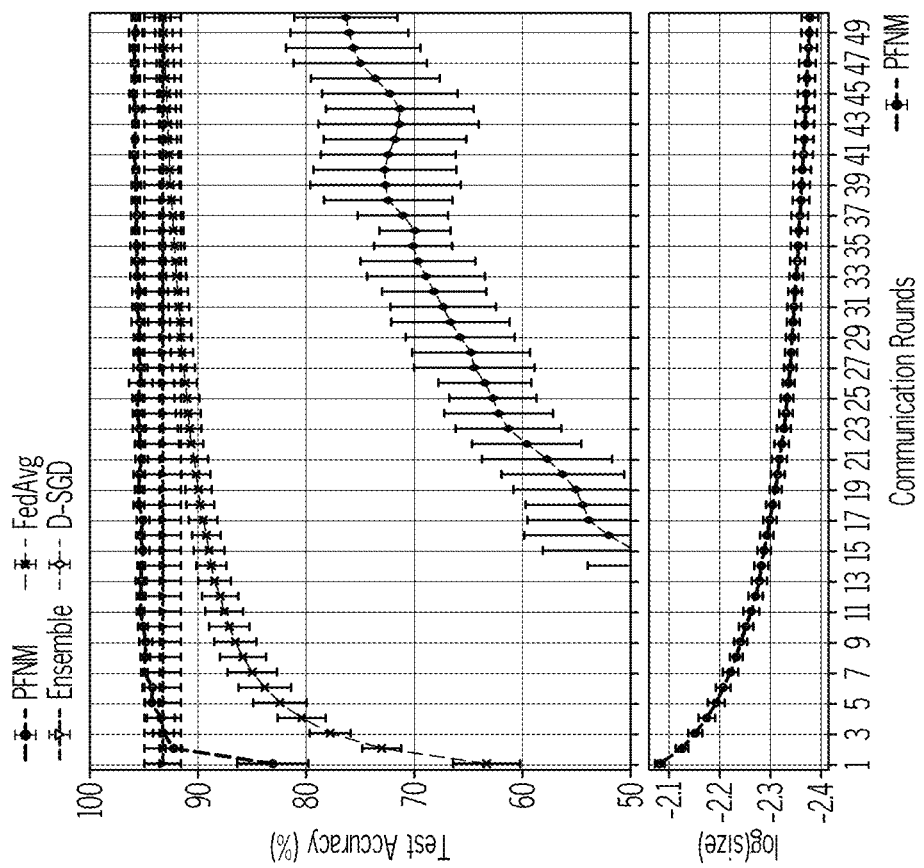
Figure 7F:
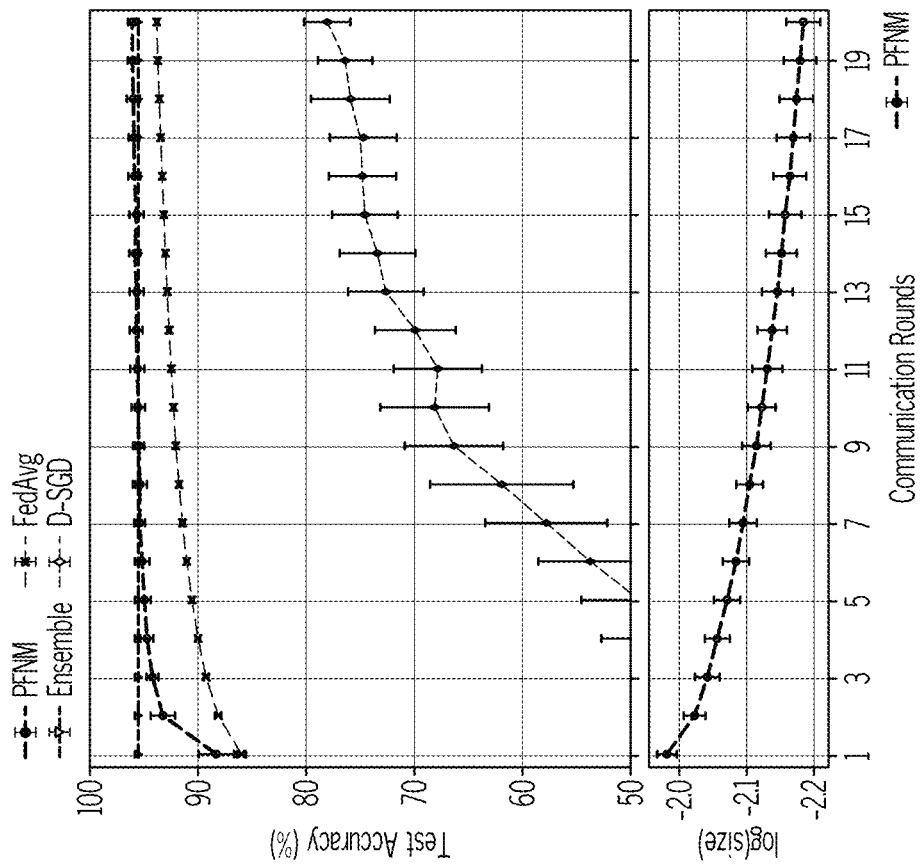
Figures 7G, 7H:
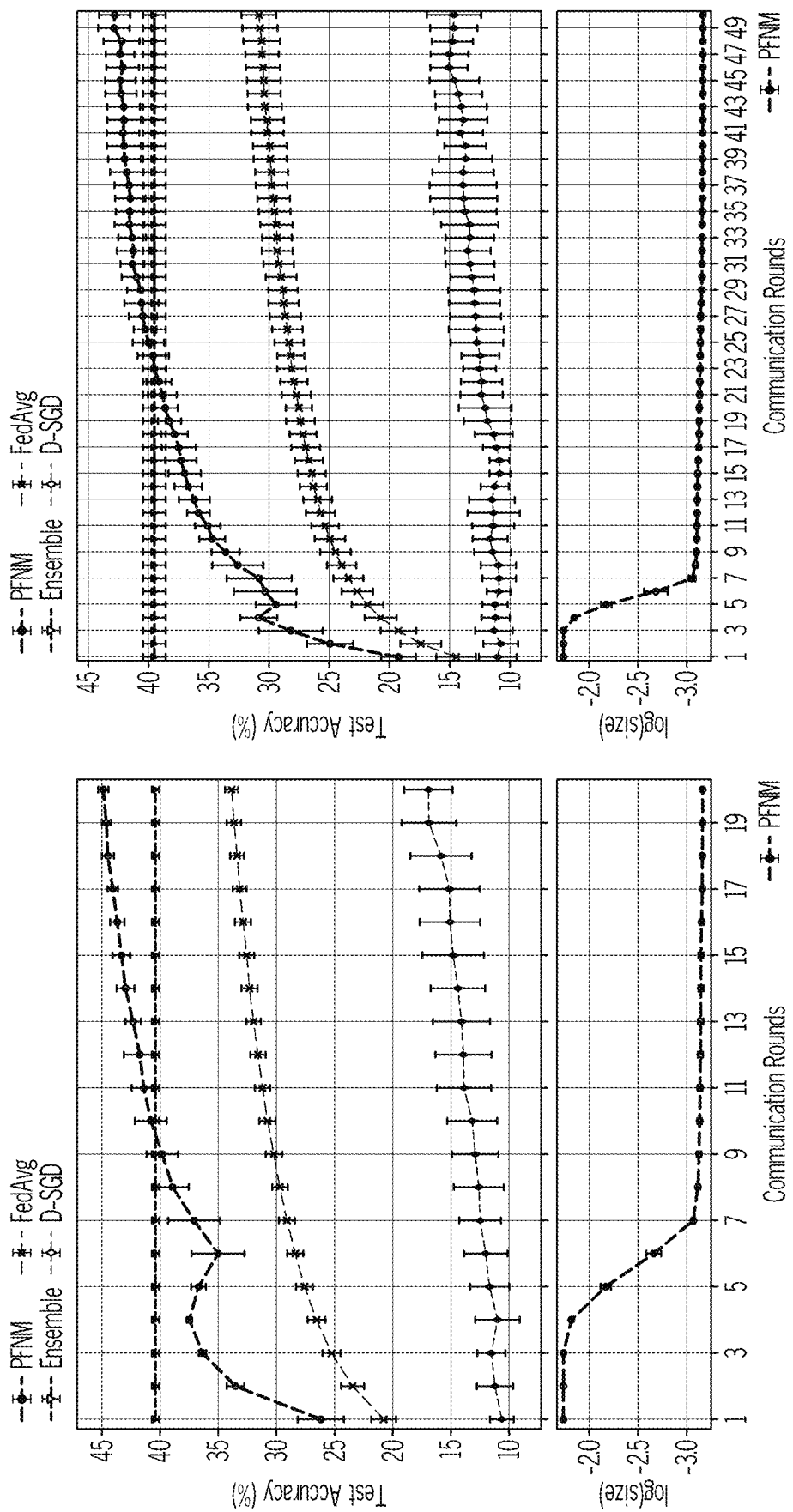
Figure 8A:
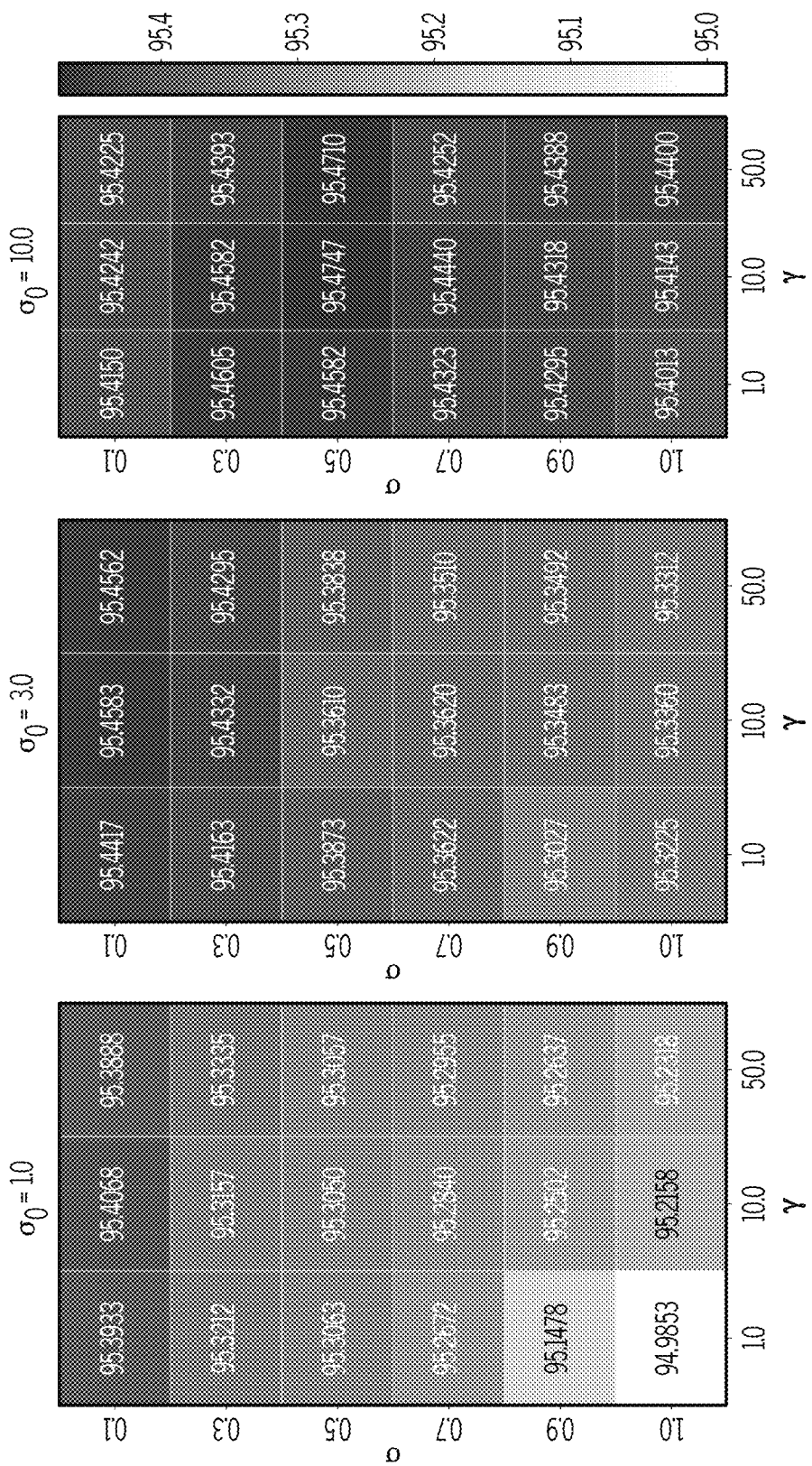
FIG. 8A-8D are charts of parameter sensitivity for single hidden layer model according to an embodiment of the present invention.
Figure 8B:
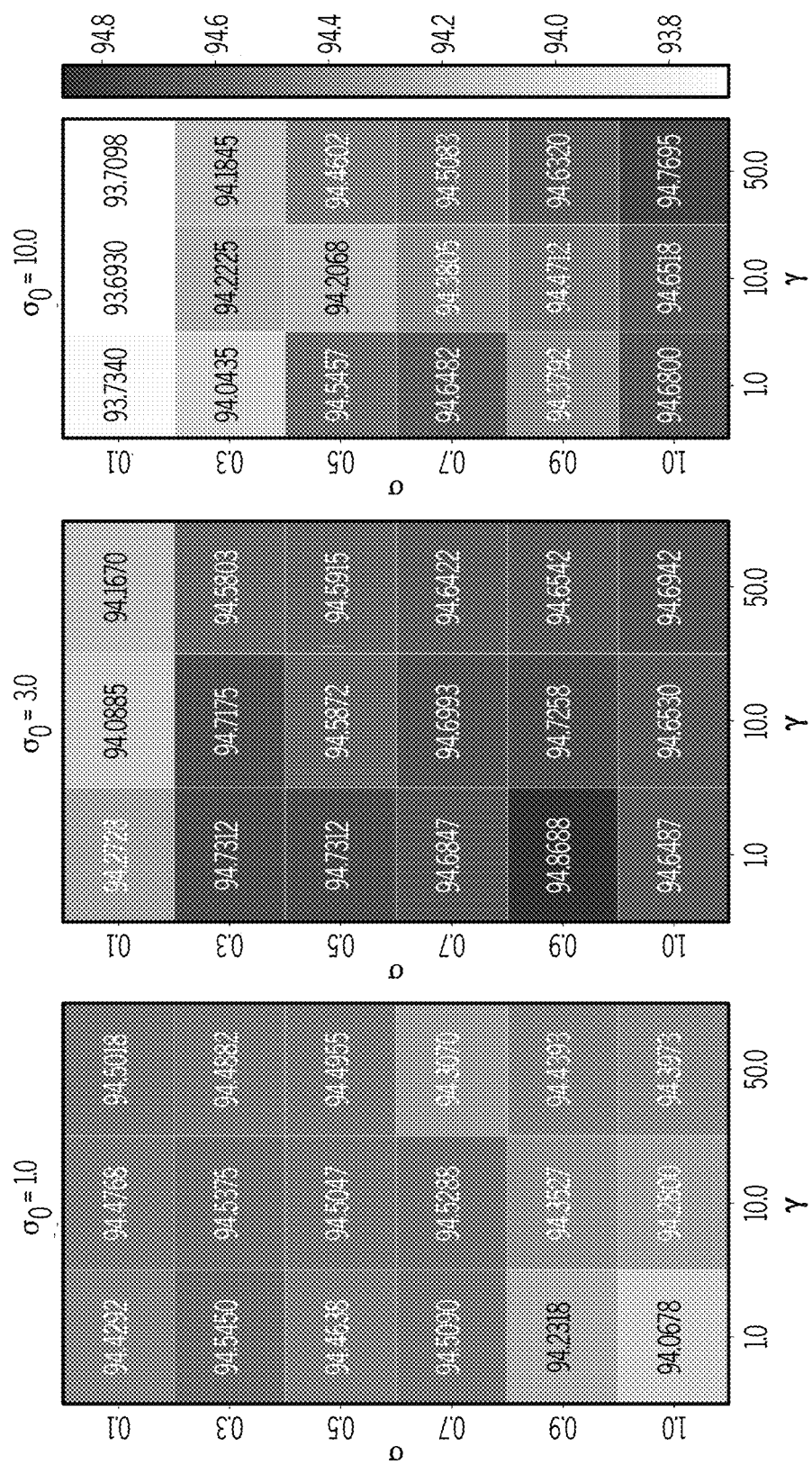
Figure 8C:
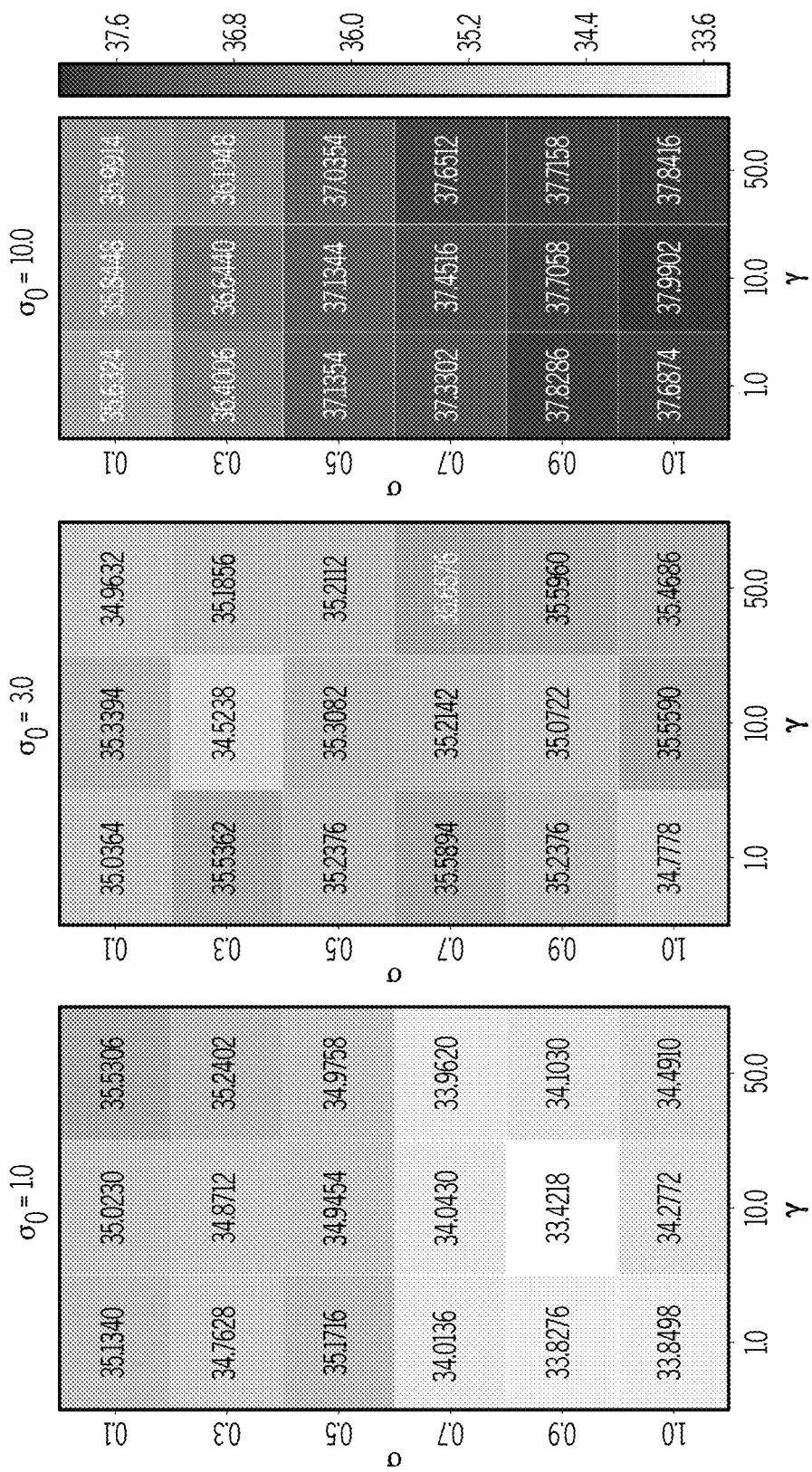
Figure 8D:
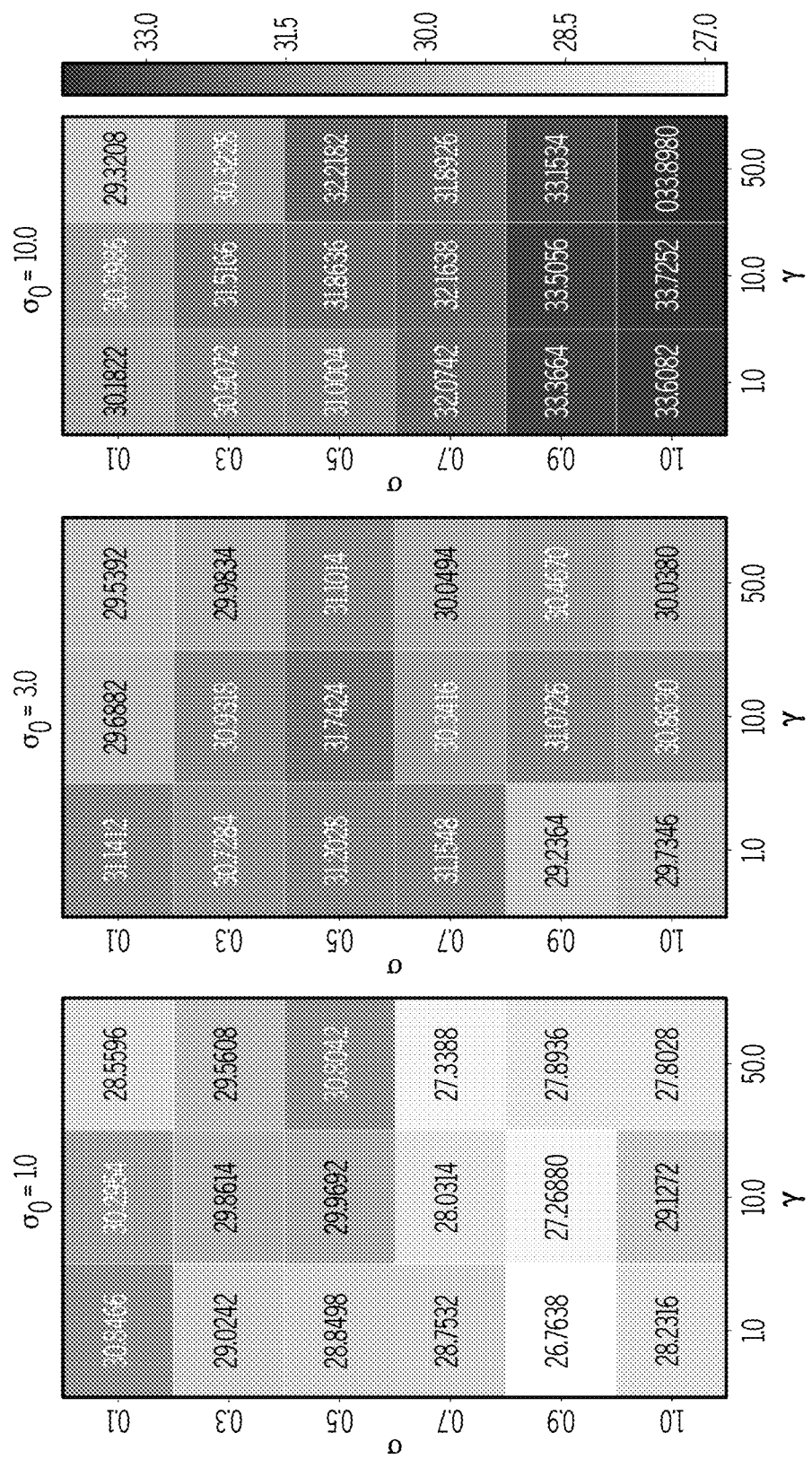

FIG. 5 shows a flow diagram 500 of managing efficient machine learning. In this example, the process is performed by the server 140, 1050. The process beings on step 502 and immediately proceeds to 504.

In step 504, the structure of which is shown in FIG. 1, is a plurality of client computing devices 102, 104, 106, 108 are communicatively coupled with a centralized computing device 140, 1050. Each of the plurality of client computing devices 102, 104, 106, 108 includes a local machine learning model 122, 124, 126, 128 that is pre-trained on locally accessible data 112, 114, 116, 118. The locally accessible data has a common structure across all the plurality of client computing devices. In one embodiment each of the plurality of client computing devices 102, 104, 106, 108 includes a local machine learning model that is a multilayer artificial neural network.

In another embodiment each of the plurality of client computing devices includes the local machine learning model that is trained on locally accessible data in which the data distribution changes over time. The locally accessible data may have a structure that is heterogeneous across all the plurality of client computing devices while maintaining some degree of overlap such that matching can occur.

The process continues to step 506. In step 506, the computer-implemented method includes accessing, by the centralized computing device 140, 1050, a plurality of artificial local neurons 150 from each of the local machine learning models. In one embodiment the accessing requires only a single read communication between the centralized computing device and each of the plurality of client computing devices 102, 104, 106, 108. The process continues to step 508.

In step 508, the computer-implemented method further includes clustering each of the plurality of artificial local neurons into a plurality of specific groups as part of a set of global neurons. Examples of clustering disclosed in the present invention includes any combination of:
     performing clustering with permutation-invariant probabilistic matching each of the plurality of artificial neurons using Bayesian nonparametrics;
     performing clustering with groups of weight vectors, bias vectors, or a combination of weight vectors and bias vectors associated with each of the plurality of artificial local neurons;

controlling clustering by hyperparameters;
clustering produces a results in which at least one of the plurality of artificial local neurons being left unmatched; and
clustering produces a results in which a number of neurons in the set of global neurons being smaller than a numeric sum of all of the plurality of artificial local neurons.

The process continues to step 510. Next in step 510, the computer-implemented method includes forming a global machine learning model layer by averaging the plurality of artificial local neurons previously clustered into one of a plurality of specific groups as part of a set of global neurons. The process continues to step 512.

In step 512, a test is made to see if any data changed locally in the client computing devices 102, 104, 106, 108. If data has changed or a timer has not expired (not shown) the process continues back to step 506. Otherwise, if the timer has expired or the data has not changed, the process continues to step 514. The process ends in step 514.

Experiments

To verify our methodology we simulate federated learning scenarios using two standard datasets: MNIST and CIFAR-10. We randomly partition each of these datasets into J batches. Two partition strategies are of interest: (a) a homogeneous partition where each batch has approximately equal proportion of each of the K classes; and (b) a heterogeneous partition for which batch sizes and class proportions are unbalanced. We simulate a heterogeneous partition by simulating $p_k \sim Dir_J(0.5)$ and allocating a $p_{k,j}$ proportion of the instances of class k to batch j. Note that due to the small concentration parameter (0.5) of the Dirichlet distribution, some sampled batches may not have any examples of certain classes of data. For each of the four combinations of partition strategy and dataset we run 10 trials to obtain mean performances with standard deviations.

To verify our methodology we simulate federated learning scenarios using two standard datasets: MNIST and CIFAR-10. We randomly partition each of these datasets into J batches. Two partition strategies are of interest: (a) a homogeneous partition where each batch has approximately equal proportion of each of the K classes; and (b) a heterogeneous partition for which batch sizes and class proportions are unbalanced. We simulate a heterogeneous partition by simulating $p_k \sim Dir_J(0.5)$ and allocating a $p_{k,j}$ proportion of the instances of class k to batch j. Note that due to the small concentration parameter (0.5) of the Dirichlet distribution, some sampled batches may not have any examples of certain classes of data. For each of the four combinations of partition strategy and dataset we run 10 trials to obtain mean performances with standard deviations.

Turning to FIG. 6 shows a single communication federated learning. TOP: Test accuracy and normalized model size $$\left(\log \frac{L}{\sum_j L_j}\right)$$

as a function of varying number of batches (J). BOTTOM: Test accuracy and normalized model size for multi-layer networks as a function of number of layers. PFNM consistently outperforms local models and federated averaging while performing comparably to ensembles at a fraction of the storage and computational costs.

Learning with single communication First we consider a scenario where a global neural network needs to be constructed with a single communication round. This imitates the real-world scenario where data is no longer available and we only have access to pre-trained local models (i.e. "legacy" models). To be useful, this global neural network needs to outperform the individual local models. Ensemble methods [Dietterich 2000; Breiman 2001] are a classic approach for combining predictions of multiple learners. They often perform well in practice even when the ensemble members are of poor quality. Unfortunately, in the case of neural networks, ensembles have large storage and inference costs, stemming from having to store and forward propagate through all local networks. The performance of local NNs and the ensemble method define the lower and upper extremes of aggregating when limited to a single communication. We also compare to other strong baselines, including federated averaging of local neural networks trained with the same random initialization as proposed by [McMahan et al. 2017]. We note that a federated averaging variant without the shared initialization would likely be more realistic when trying to aggregate pre-trained models, but this variant performs significantly worse than all other baselines. We also consider k-Means clustering [Lloyd 1982] of vectors constructed by concatenating weights and biases of local neural networks. The key difference between k-Means and our approach is that clustering, unlike matching, allows several neurons from a single neural network to be assigned to the same global neuron, potentially averaging out their individual feature representations. Further, k-Means requires us to choose k, which we set to K=min(500,50J). In contrast, PFNM nonparametrically learns the global model size and other hyperparameters, i.e. $\sigma$, $\sigma_0$, $\gamma_0$, are chosen based on the training data. We discuss parameter sensitivity in section three of the Supplement.

FIG. 7 presents our results with single hidden layer neural networks for varying number of batches J. Shown are tests of accuracy and normalized model size as a function of number of communication rounds for J=25 batches for an one (TOP) and two layer (BOTTOM) neural network. PFNM consistently outperforms strong competitors. Note that a higher number of batches implies fewer data instances per batch, leading to poorer local model performances. The upper plots summarize test data accuracy, while the lower plots show the model size compression achieved by PFNM. Specifically we plot $$\log \frac{L}{\sum_j L_j},$$

which is the log ratio of the PFNM global model size L to the total number of neurons across all local models (i.e. the size of an ensemble model). In this and subsequent experiments each local neural network has $L_j=100$ hidden neurons. We see that PFNM produces strong results, occasionally even outperforming ensembles. In the heterogeneous setting we observe a noticeable degradation in the performance of the local NNs and of k-means, while PFNM retains its good performance. It is worth noting that the gap between PFNM and ensemble increases on CIFAR10 with J, while it is constant (and even in favor of PFNM) on MNIST. This is not surprising. Ensemble methods are known to perform particularly well at aggregating "weak" learners (recall higher J implies smaller batches) [Breiman 2001], while PFNM assumes the neural networks being aggregated already perform reasonably well.

Next, we investigate aggregation of multi-layer neural networks, each using a hundred neurons per layer. The extension of k-means to this setting is unclear and k-means is excluded from further comparisons. In FIG. 7, we show that PFNM again provides drastic and consistent improvements over local models and federated averaging. It performs marginally worse than ensembles, especially for deeper networks on CIFAR10. This aligns with our previous observation when there is insufficient data for training good local models, PFNM's performance marginally degrades with respect to ensembles, but still provides significant compression over ensembles.

Learning with Limited Communication

While in some scenarios limiting communication to a single communication round may be a hard constraint, we also consider situations, that frequently arise in practice, where a limited amount of communication is permissible. To this end, we investigate federated learning with J=25 batches and up to twenty communications when the data has a homogeneous partition and up to fifty communications under a heterogeneous partition. We compare PFNM, using the communication procedure from Section entitled "Neural Matching With Additional Communication" ($\sigma=\sigma_0=\gamma_0=1$ across experiments) to federated averaging and the distributed optimization approach, downpour SGD (D-SGD) of [Dean et al. 2012]. In this limited communication setting, the ensembles can be outperformed by many distributed learning algorithms provided a large enough communication budget. An interesting metric then is the number of communications rounds required to outperform ensembles.

We report results with both one and two layer neural networks in FIG. 7. In either case, we use a hundred neurons per layer. PFNM outperforms ensembles in all scenarios, given sufficient communications. Moreover, in all experiments, PFNM requires significantly fewer communication rounds than both federated averaging and D-SGD to achieve a given performance level. In addition to improved performance, additional rounds of communication allow PFNM to shrink the size of the global model as demonstrated in FIG. 7. In FIG. 7A to FIG. 7H we note steady improvement in accuracy and a reduction in the global model size. In CIFAR10 experiments, the two layer PFNM network's performance temporarily drops, which corresponds to a sharp reduction in the size of the global network. See FIG. 7G and FIG. 7H.

Experimental Details and Additional Results

Data partitioning. In the federated learning setup, we analyze data from multiple sources, which we call batches. Data on the batches does not overlap and may have different distributions. To simulate federated learning scenario we consider two partition strategies of MNIST and CIFAR-10. For each pair of partition strategy and dataset we run 10 trials to obtain mean accuracies and standard deviations. The easier case is homogeneous partitioning, i.e. when class distributions on batches are approximately equal as well as batch sizes. To generate homogeneous partitioning with J batches we split examples for each of the classes into J approximately equal parts to form J batches. In the heterogeneous case, batches are allowed to have highly imbalanced class distributions as well as highly variable sizes. To simulate heterogeneous partition, for each class k, we sample $p\_k \sim Dir\_J$ (0.5) and allocate $p\_(k,j)$ proportion of instances of class k of the complete dataset to batch j. Note that due to small concentration parameter, 0.5, of the Dirichlet distribution, some batches may entirely miss examples of a subset of classes.

Batch networks training. Our modeling framework and ensemble related methods operate on collection of weights of neural networks from all batches. Any optimization procedure and software can be used locally on batches for training neural networks. We used PyTorch [Paszke et al. 2017] to implement the networks and train these using the AMSGrad optimizer [Reddi et al. 2018] with default parameters unless otherwise specified. For reproducibility we summarize all parameter settings in Table 1.

TABLE 1

Parameter settings for batch neural networks training

| | MNIST | CIFAR-10 |
|---|---|---|
| Neurons per layer | 100 | 100 |
| Learning rate | 0.01 | 0.001 |
| $L_2$ regularization | $10^{-6}$ | $10^{-5}$ |
| Minibatch size | 32 | 32 |
| Epochs | 10 | 10 |
| Weights initialization | $\mathcal{N}$ (0, 0.01) | $\mathcal{N}$ (0, 0.01) |
| Bias initialization | 0.1 | 0.1 |

Parameter Settings for the Baselines

We first formally define the ensemble procedure. Let $\hat{y}_{j,l} \in \Delta^{K-1}$ denote the probability distribution over the K classes output by neural network trained on data from batch j for some test input x. Then ensemble prediction is $$\arg\max_k \frac{1}{J} \sum_{j=1}^{J} \hat{y}_{j,k}.$$

In our experiments, we train each individual network on the specific batch dataset using the parameters listed in Table 1, and then compute the performance using the ensemble aggregation technique.

For the downpour SGD [Dean et al. 2012] we used PyTorch, SGD optimizer and parameter settings as in Table 1 for the local learners. The master neural network was optimized with Adam and the same initial learning rate as in the Table 1. The local learners communicated the accumulated gradients back to the master network after every mini-batch update. This translates to the setting of [Dean et al. 2012] with parameters $n_{push} = n_{fetch} = 1$. Note that with this approach the global network and networks for each of the batches are constrained to have identical number of neurons per layer, which is 100 in our experiments For Federated Averaging [McMahan et al. 2017], we use SGD optimizer for learning the local networks with the rest of the parameters as defined in Table 1. We initialize all the local networks with the same seed, and train these networks for 10 epochs initially and for 5 epochs after the first communication round. At each communication round, we utilize all the local networks (C=1) for the central model update.

Parameter Settings for Matching with Additional Communications

For neural matching with additional communications, we train the local networks for 10 epochs for the first communication round, and 5 epochs thereafter. All the other parameters are as mentioned in Table 1. The local networks are trained using AMSGrad optimizer [Reddi et al. (2018) Reddi, Kale, and Kumar], and the optimizer parameters are reset after every communication. We also found it useful to decay the initial learning rate by a factor of 0.99 after every communication.

Parameter Sensitivity Analysis for PFNM

Figure 9B:
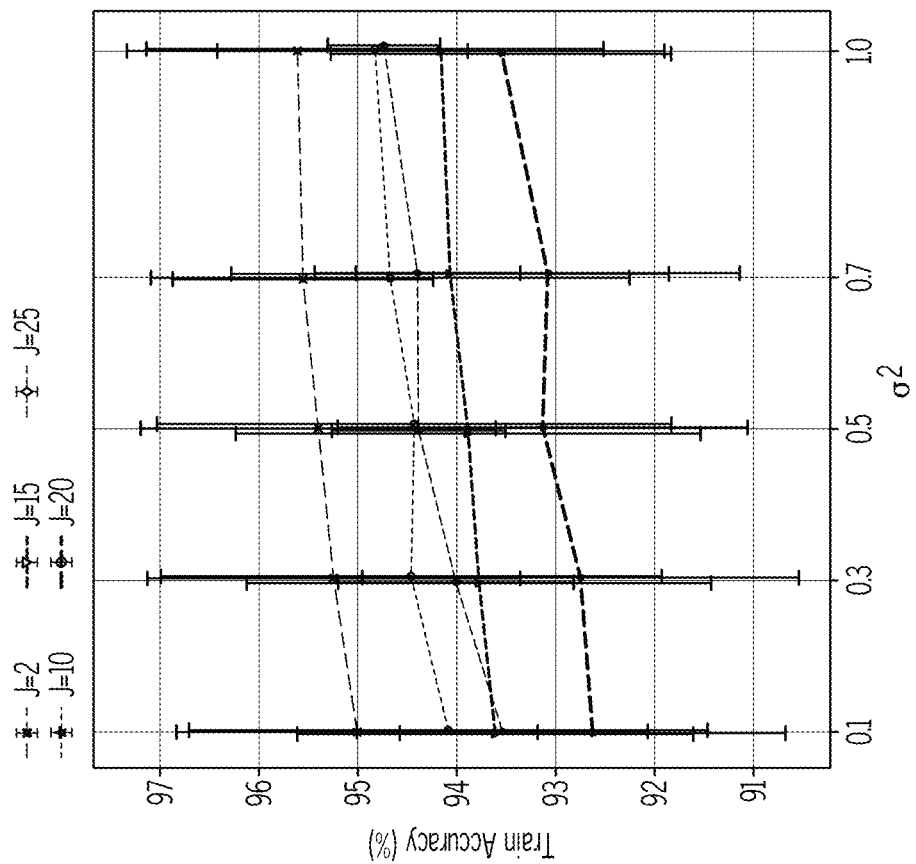
Figure 9A:
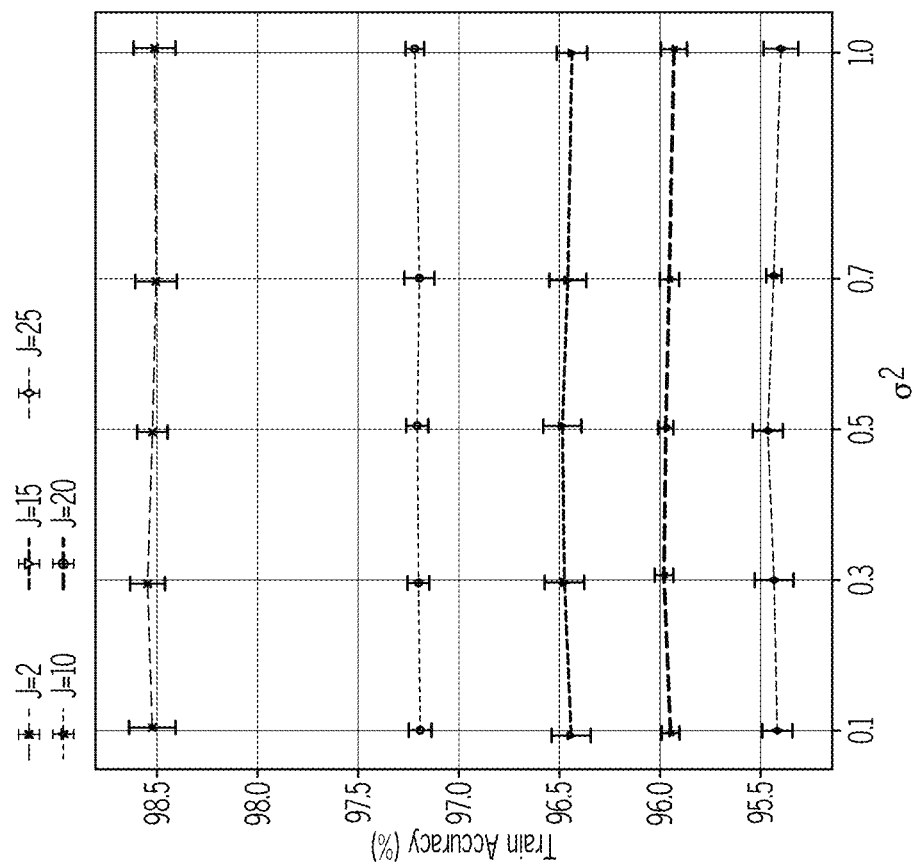

Our models presented in Section 3 of the main text have three parameters $\sigma_0^2$, $\gamma_0$ and $\sigma^2 = \sigma_1^2 = \ldots = \sigma_J^2$. The first parameter, $\sigma_0^2$, is the prior variance of weights of the global neural network. Second parameter, $\gamma_0$, controls discovery of new neurons and correspondingly increasing $\gamma_0$ increases the size of the learned global network. The third parameter, $\sigma^2$, is the variance of the local neural network weights around corresponding global network weights. We empirically analyze the effect of these parameters on the accuracy for single hidden layer model with J=25 batches in FIG. 8. The heatmap indicates the accuracy on the training data—we see that for all parameter values considered performance doesn't not fluctuate significantly. PFNM appears to be robust to choices of $\sigma_0^2$ and $\gamma_0$, which we set to 10 and 1 respectively in the experiments with single communication round. Parameter $\sigma^2$ has slightly higher impact on the performance and we set it using training data during experiments. To quantify importance of $\sigma^2$ for fixed $\sigma_0^2 = 10$ and $\gamma_0 = 1$ we plot average train data accuracies for varying $\sigma^2$ in FIG. 9. We see that for homogeneous partitioning and one hidden layer $\sigma^2$ has almost no effect on the performance (FIG. 9A and FIG. 9C). In the case of heterogeneous partitioning (FIG. 9B and FIG. 9D), effect of $\sigma^2$ is more noticeable, however all considered values result in competitive performance.

Discussion

In this work, we have developed methods for federated learning of neural networks, and empirically demonstrated their favorable properties. Our methods are particularly effective at learning compressed federated networks from pre-trained local networks and with a modest communication budget can outperform state-of-the-art algorithms for federated learning of neural networks. In future work, we plan to explore more sophisticated ways of combining local networks especially in the regime where each local network has very few training instances. Our current matching approach is completely unsupervised—incorporating some form of supervision may help further improve the performance of the global network, especially when the local networks are of poor quality. Finally, it is of interest to extend our modeling framework to other architectures such as Convolutional Neural Networks (CNNs) and Recurrent Neural Networks (RNNs). The permutation invariance necessitating matching inference also arises in CNNs since any permutation of the filters results in the same output, however additional bookkeeping is needed due to the pooling operations.

Example Computer System

Figure 10:
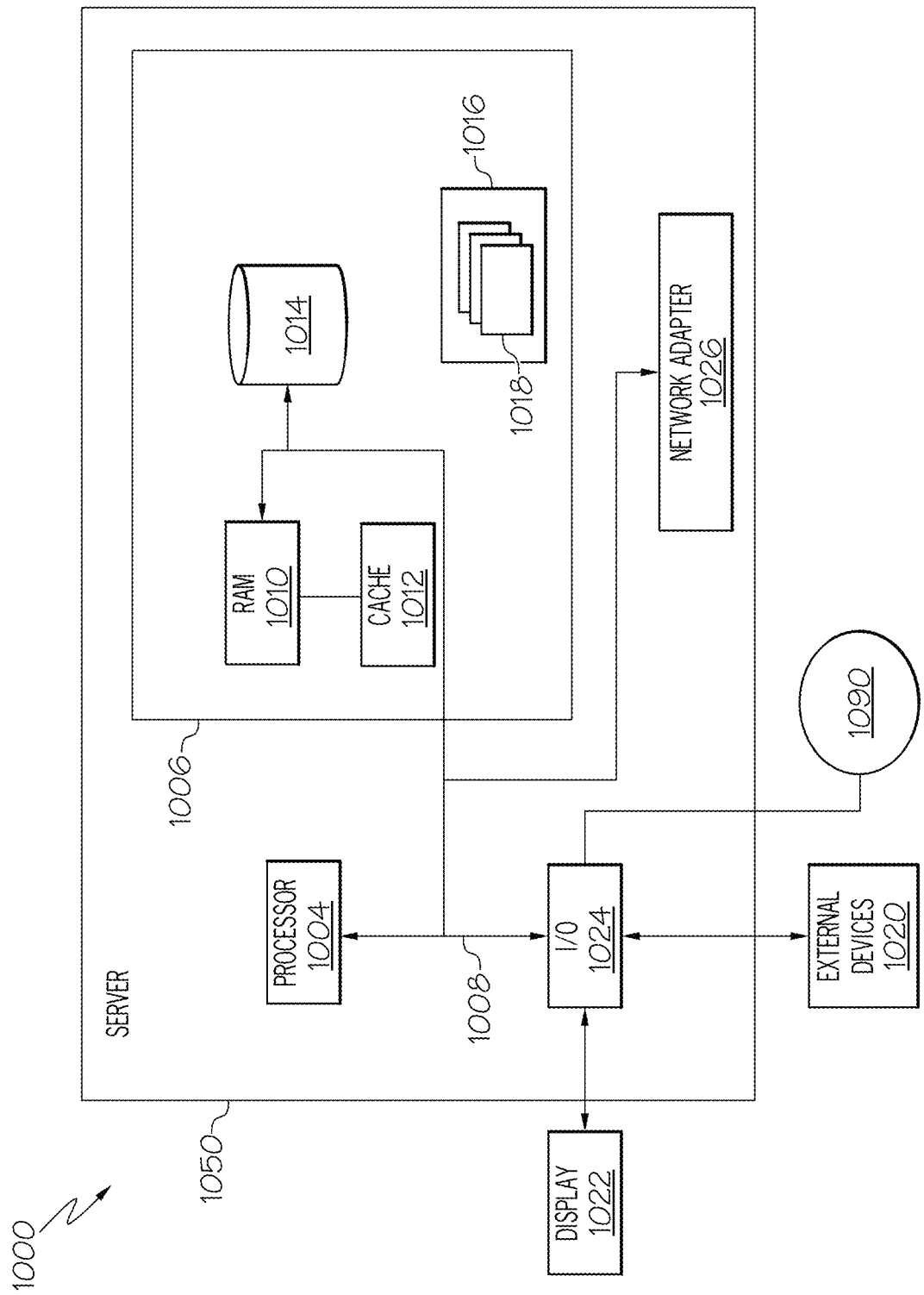
FIG. 10 illustrates a block diagram of an exemplary system for managing efficient machine learning, according to an embodiment of the present invention.

FIG. 10 illustrates a block diagram of an exemplary system for managing and communication efficient machine learning, according to an embodiment of the present invention The system 1000 shown in FIG. 10 is only one example of a suitable system and is not intended to limit the scope of use or functionality of embodiments of the present invention described above. The system 1000 is operational with numerous other general purpose or special purpose computing system environments or configurations. Examples of well-known computing systems, environments, and/or configurations that may be suitable for use with the information processing system 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, clusters, and distributed cloud computing environments that include any of the above systems or devices, and the like.

The system 1000 may be described in the general context of computer-executable instructions, being executed by a computer system. The system 1000 may be practiced in various computing environments such as conventional and distributed computing environments where tasks are performed by remote processing devices that are linked through a communications network. In a distributed computing environment, program modules may be located in both local and remote computer system storage media including memory storage devices.

Referring again to FIG. 10, system 1000 includes the server 1050. In some embodiments, server 1050 can be embodied as a general-purpose computing device. The components of server 1050 can include, but are not limited to, one or more processor devices or processing units 1004, a system memory 1006, and a bus 1008 that couples various system components including the system memory 1006 to the processor 1004.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1006 can also include computer system readable media in the form of volatile memory, such as random access memory (RAM) 1010 and/or cache memory 1012. The server 1050 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product embodying a set of program modules 1018 that are configured to carry out one or more features and/or functions of the present invention e.g., described with reference to FIGS. 1-5. Referring again to FIG. 10, program/utility 1016, having a set of program modules 1018, may be stored in memory 1006 by way of example, and not limitation, as well as an operating system, one or more application programs, other program modules, and program data. Generally, program modules may include routines, programs, objects, components, logic, data structures, and so on that perform particular tasks or implement particular abstract data types. Each of the operating system, one or more application programs, other program modules, and program data or some combination thereof, may include an implementation of a networking environment. In some embodiments, program modules 1018 are configured to carry out one or more functions and/or methodologies of embodiments of the present invention.

The server 1050 can also communicate with one or more external devices 1020 that enable interaction with the server 1050; and/or any devices (e.g., network card, modem, etc.) that enable communication with one or more other computing devices. A few (non-limiting) examples of such devices include: a keyboard, a pointing device, a display 1022 presenting system performance tuning dashboard 500, etc.; one or more devices that enable a user to interact with the server 1050; and/or any devices (e.g., network card, modem, etc.) that enable the server 1050 to communicate with one or more other computing devices. Such communication can occur via I/O interfaces 1024. In some embodiments, the server 1050 can communicate with one or more networks such as a local area network (LAN), a general wide area network (WAN), and/or a public network (e.g., the Internet) via network adapter 1026, enabling the system 1000 to access a parameter server 180. As depicted, the network adapter 1026 communicates with the other components of the server 1050 via the bus 1008. Other hardware and/or software components can also be used in conjunction with the server 1050. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product 1090 at any possible technical detail level of integration. The computer program product 1090 may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, although not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, although not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, although do not preclude the presence or addition of one or more other features, integers, steps, operations, elements, components, and/or groups thereof.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand various embodiments of the present invention, with various modifications as are suited to the particular use contemplated.

What is claimed is:

1. A computer-implemented method for managing efficient machine learning, the method comprising:
   operating a network in which a plurality of client computing devices are communicatively coupled with a centralized computing device, wherein each of the plurality of client computing devices includes a local machine learning model that is pre-trained on locally accessible data, and wherein the locally accessible data has a common structure across all the plurality of client computing devices;
   accessing, by the centralized computing device, a plurality of artificial local neurons from each of the local machine learning models;
   clustering each of the plurality of artificial local neurons into a plurality of specific groups as part of a set of global neurons is performed using a combination comprising permutation-invariant probabilistic matching of each of the plurality of artificial local neurons using Bayesian nonparametrics; and
   forming a global machine learning model layer by averaging the plurality of artificial local neurons previously clustered into one of a plurality of specific groups as part of a set of global neurons.

2. The computer-implemented method of claim 1, wherein the clustering each of the plurality of artificial local neurons into the plurality of specific groups as part of the set of global neurons is performed with groups of weight vectors, bias vectors, or a combination of weight vectors and bias vectors associated with each of the plurality of artificial local neurons.

3. The computer-implemented method of claim 1, wherein the clustering each of the plurality of artificial local neurons into the plurality of specific groups as part of the set of global neurons is controlled by hyperparameters.

4. The computer-implemented method of claim 1, wherein the clustering each of the plurality of artificial local neurons into the plurality of specific groups as part of the set of global neurons results in one or more of the plurality of artificial local neurons being left unmatched.

5. The computer-implemented method of claim 1, wherein the clustering each of the plurality of artificial local neurons into the plurality of specific groups as part of the set of global neurons results in a number of neurons in the set of global neurons being smaller than a numeric sum of all of the plurality of artificial local neurons.

6. The computer-implemented method of claim 1, wherein the accessing, by the centralized computing device, the plurality of artificial local neurons from each of the plurality of client computing devices requires only a single read communication between the centralized computing device and each of the plurality of client computing devices.

7. The computer-implemented method of claim 1, wherein each of the plurality of client computing devices includes a local machine learning model that is a multilayer artificial neural network.

8. The computer-implemented method of claim 1, wherein each of the plurality of client computing devices includes the local machine learning model that is pre-trained on locally accessible data in which the locally accessible data changes overtime.

9. The computer-implemented method of claim 1, wherein the locally accessible data has a common structure that is both heterogeneous and overlapping across all the plurality of client computing devices.

10. A computer system for managing efficient machine learning, the computer system comprising:
a processor device; and
a memory operably coupled to the processor device and storing computer-executable instructions causing:
operating a network in which a plurality of client computing devices are communicatively coupled with a centralized computing device, wherein each of the plurality of client computing devices includes a local machine learning model that is pre-trained on locally accessible data, and wherein the locally accessible data has a common structure across all the plurality of client computing devices; accessing, by the centralized computing device, a plurality of artificial local neurons from each of the local machine learning models;
clustering each of the plurality of artificial local neurons into a plurality of specific groups as part of a set of global neurons is performed using a combination comprising permutation-invariant probabilistic matching of each of the plurality of artificial local neurons using Bayesian nonparametrics; and
forming a global machine learning model layer by averaging the plurality of artificial local neurons previously clustered into one of a plurality of specific groups as part of a set of global neurons.

11. The computer system of claim 10, wherein the clustering each of the plurality of artificial local neurons into the plurality of specific groups as part of the set of global neurons is performed with groups of weight vectors, bias vectors, or a combination of weight vectors and bias vectors associated with each of the plurality of artificial local neurons.

12. The computer system of claim 10, wherein the clustering each of the plurality of artificial local neurons into the plurality of specific groups as part of the set of global neurons is controlled by hyperparameters.

13. The computer system of claim 10, wherein the clustering each of the plurality of artificial local neurons into the plurality of specific groups as part of the set of global neurons results in one or more of the plurality of artificial local neurons being left unmatched.

14. The computer system of claim 10, wherein the clustering each of the plurality of artificial local neurons into the plurality of specific groups as part of the set of global neurons results in a number of neurons in the set of global neurons being smaller than a numeric sum of all of the plurality of artificial local neurons.

15. The computer system of claim 10, wherein the accessing, by the centralized computing device, the plurality of artificial local neurons from each of the plurality of client computing devices requires only a single read communication between the centralized computing device and each of the plurality of client computing devices.

16. The computer system of claim 10, wherein each of the plurality of client computing devices includes a local machine learning model that is a multilayer artificial neural network.

17. The computer system of claim 10, wherein each of the plurality of client computing devices includes the local machine learning model that is pre-trained on locally accessible data in which the locally accessible data changes overtime.

18. A computer program product for managing efficient machine learning, the computer program product comprising:
a non-transitory computer readable storage medium readable by a processing device and storing program instructions for execution by the processing device, said program instructions comprising:
operating a network in which a plurality of client computing devices are communicatively coupled with a centralized computing device, wherein each of the plurality of client computing devices includes a local machine learning model that is pre-trained on locally accessible data, and wherein the locally accessible data has a common structure across all the plurality of client computing devices;
accessing, by the centralized computing device, a plurality of artificial local neurons from each of the local machine learning models;
clustering each of the plurality of artificial local neurons into a plurality of specific groups as part of a set of global neurons is performed using a combination comprising permutation-invariant probabilistic matching of each of the plurality of artificial local neurons using Bayesian nonparametrics; and
forming a global machine learning model layer by averaging the plurality of artificial local neurons previously clustered into one of a plurality of specific groups as part of a set of global neurons.

* * * * *